United States Patent
Ohnishi

(10) Patent No.: US 9,612,710 B2
(45) Date of Patent: Apr. 4, 2017

(54) STORAGE MEDIUM HAVING STORED THEREON IMAGE PROCESSING PROGRAM AND IMAGE PROCESSING APPARATUS

(75) Inventor: Naonori Ohnishi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1864 days.

(21) Appl. No.: 12/252,640

(22) Filed: Oct. 16, 2008

(65) Prior Publication Data

US 2010/0053206 A1 Mar. 4, 2010

(30) Foreign Application Priority Data

Sep. 4, 2008 (JP) ................. 2008-227515

(51) Int. Cl.
| | | |
|---|---|---|
| *G09G 5/02* | (2006.01) | |
| *G06F 3/0481* | (2013.01) | |
| *G06T 13/80* | (2011.01) | |
| *G06T 3/60* | (2006.01) | |

(52) U.S. Cl.
CPC ............. *G06F 3/0481* (2013.01); *G06T 3/60* (2013.01); *G06T 13/80* (2013.01)

(58) Field of Classification Search
CPC ........... G06F 3/04845; G06F 1/1694; G06F 17/2264; G06F 3/0481; G06T 17/20; G06T 17/205; G06T 2207/10016; G06T 2219/2016; G09G 2340/04; G09G 2340/0464; A61B 2019/5289
USPC ....... 345/646, 650, 661, 676, 672, 629, 698; 382/293; 715/792; 348/561
See application file for complete search history.

(56) References Cited

U.S. PATENT DOCUMENTS

| | | | | | |
|---|---|---|---|---|---|
| 5,075,785 | A | * | 12/1991 | Sugishima | ............. 358/448 |
| 6,307,561 | B1 | * | 10/2001 | Doi et al. | ............. 345/473 |
| 7,164,433 | B2 | * | 1/2007 | Suzuki et al. | ............ 345/698 |
| 7,305,617 | B2 | * | 12/2007 | McCully | ............. 715/202 |
| 7,355,583 | B2 | | 4/2008 | Beardsley et al. | |
| 7,423,660 | B2 | * | 9/2008 | Ouchi et al. | ............. 345/684 |
| 7,736,220 | B2 | * | 6/2010 | Mori | ............. 463/6 |
| 2002/0191867 | A1 | * | 12/2002 | Le et al. | ............. 382/300 |
| 2004/0164934 | A1 | * | 8/2004 | Jeong | ............. 345/63 |
| 2005/0039494 | A1 | * | 2/2005 | Maeiwa | ............. 66/202 |

(Continued)

FOREIGN PATENT DOCUMENTS

| | | | |
|---|---|---|---|
| EP | 1 249 792 A2 | | 10/2002 |
| JP | 2004-265168 | * | 9/2004 |

(Continued)

OTHER PUBLICATIONS

"F-Secure Virus Descriptions: Cascade", Internet Citation, [Online] XP007911131 Retrieved from the Internet: URL: http://www.f-secure.com/v-descs/cascade.shtml [retrieved on Jan. 14, 2010].

(Continued)

*Primary Examiner* — Javid A Amini
(74) *Attorney, Agent, or Firm* — Nixon & Vanderhye P.C.

(57) ABSTRACT

Image generation means generates an input image corresponding to an output from a pointing device. Image display control means displays the input image generated by the image generation means on a display means. Image change control means disassembles the input image generated by the image generation means into a plurality of partial images, and changes at least one of a display position and a display form of each of the partial images.

28 Claims, 21 Drawing Sheets

(56) References Cited

U.S. PATENT DOCUMENTS

| | | | |
|---|---|---|---|
| 2005/0093807 A1* | 5/2005 | Uchiyama | 345/98 |
| 2005/0248585 A1* | 11/2005 | Inoue et al. | 345/619 |
| 2006/0227142 A1* | 10/2006 | Brown et al. | 345/473 |
| 2006/0242590 A1* | 10/2006 | Polivy et al. | 715/760 |
| 2007/0196007 A1* | 8/2007 | Chen et al. | 382/131 |
| 2008/0016176 A1* | 1/2008 | Leitner | 709/217 |
| 2008/0049025 A1* | 2/2008 | Le Tuan | 345/473 |
| 2008/0253654 A1* | 10/2008 | Delong | 382/173 |
| 2009/0093300 A1* | 4/2009 | Lutnick et al. | 463/26 |
| 2009/0153588 A1* | 6/2009 | Hasuike | 345/666 |
| 2009/0164887 A1* | 6/2009 | Ikegami | 715/247 |
| 2009/0251492 A1* | 10/2009 | Ohnishi et al. | 345/676 |
| 2009/0273615 A1* | 11/2009 | Ohnishi | 345/690 |
| 2010/0046844 A1* | 2/2010 | Kim | 382/232 |
| 2010/0053206 A1* | 3/2010 | Ohnishi | 345/619 |
| 2010/0246984 A1* | 9/2010 | Cheong et al. | 382/233 |

FOREIGN PATENT DOCUMENTS

| | | |
|---|---|---|
| JP | 2006-167192 | 6/2006 |
| JP | 2009-207730 A | 9/2009 |

OTHER PUBLICATIONS

Office Action (10 pgs.) dated Oct. 19, 2011 issued in corresponding European Application No. 08 022 217.7-2218.

Casey R. G. et al., "A Survey of Methods and Strategies in Character Segmentation," IEEE Transactions on Pattern Analysis and Machine Intelligence, IEEE Service Center, Los Alamitos, CA, US, vol. 18, No. 7, Jul. 1, 1996, pp. 690-706, XP000620246.

Communication mailed Aug. 24, 2012 in European Appln. No. 08 022 217.7 (12 pages).

Xiaolin Li et al., "Segmentation and Reconstruction of On-Line Handwritten Scripts," Pattern Recognition, Elsevier, GB, vol. 31, No. 6, Jun. 1, 1998, pp. 675-684, XP004118864.

E. Anquetil et al., "Perceptual Model of Handwriting Drawing Application to the Handwriting Segmentation Problem," Proceedings of the 4th International Conference on Document Analysis and Recognition (ICDAR), Ulm, Germany, Aug. 18-20, 1997; Los Alamitos, IEEE Comp. Soc. US, vol. 1, Aug. 18, 1997, pp. 112-117, XP010244693.

European Office Action issued in European Patent Application No. 08 022 217.7 dated Jul. 21, 2014.

* cited by examiner

F I G. 4
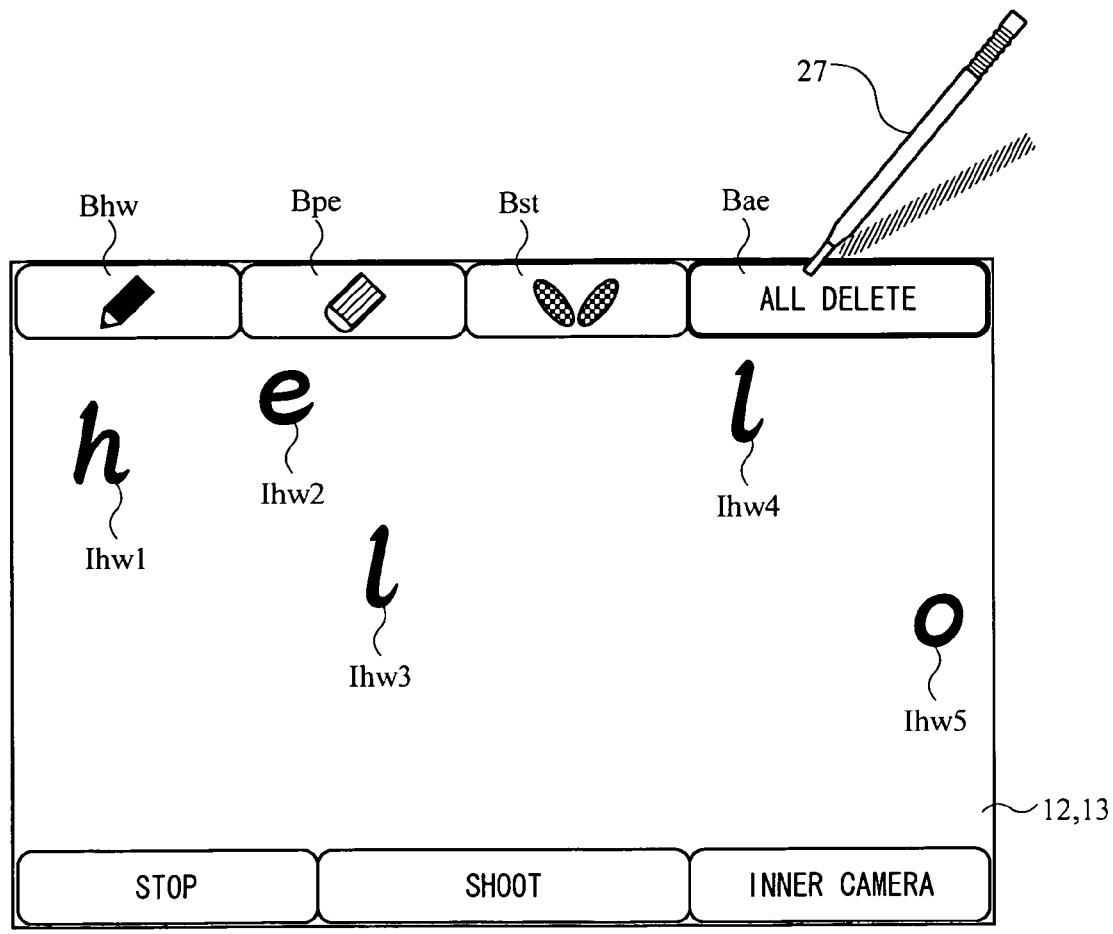

F I G. 1 0
| BLOCK NUMBER Bn | WITH-OR-WITHOUT IMAGE FLAG | GROUP NUMBER Gn | CONNECTION FLAG ||||
|---|---|---|---|---|---|---|
| | | | RIGHT | UP | LEFT | DOWN |
| 1 | OFF | 0 | OFF | OFF | OFF | OFF |
| 2 | OFF | 0 | OFF | OFF | OFF | OFF |
| ⋮ | ⋮ | ⋮ | ⋮ | ⋮ | ⋮ | ⋮ |
| 15 | ON | 1 | ON | OFF | OFF | ON |
| 16 | ON | 1 | OFF | OFF | OFF | ON |
| 17 | ON | 2 | OFF | OFF | OFF | ON |
| ⋮ | ⋮ | ⋮ | ⋮ | ⋮ | ⋮ | ⋮ |
| Bnmax | OFF | 0 | OFF | OFF | OFF | OFF |

F I G. 1 7
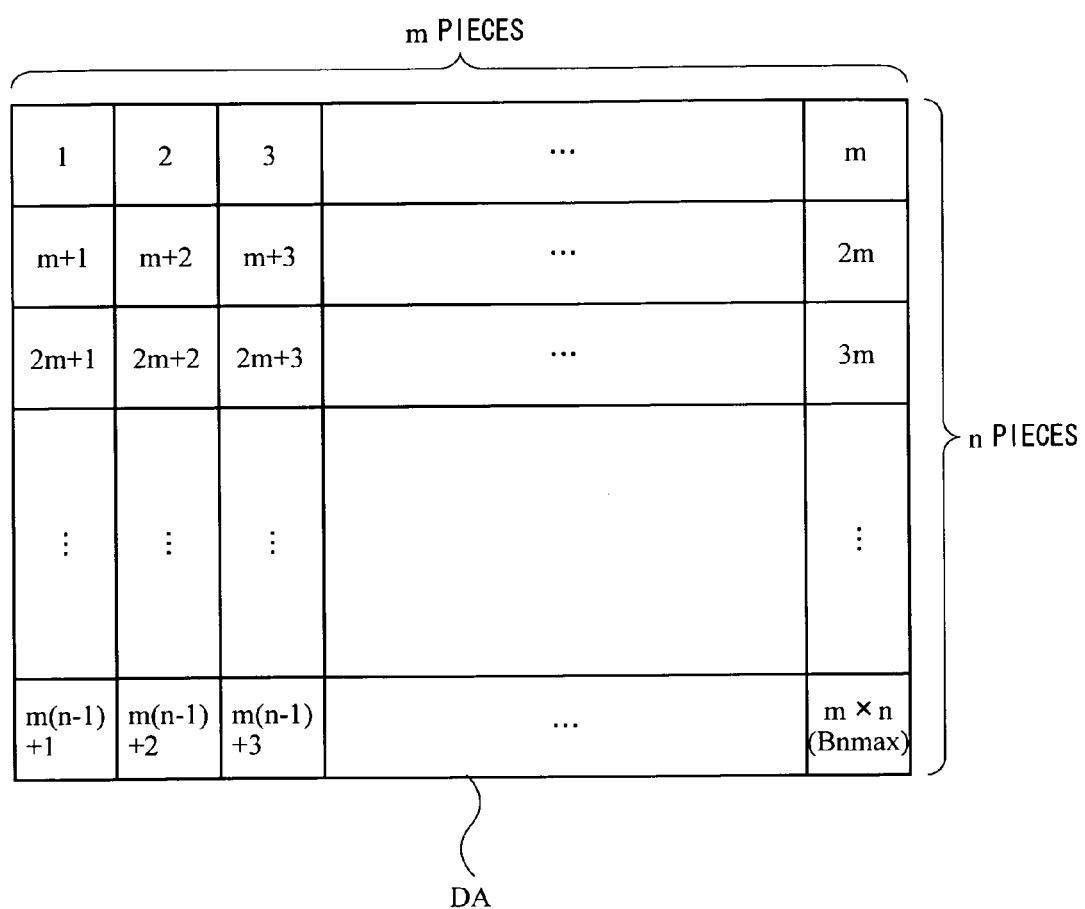

FIG. 20

| | | DETERMINATION CRITERIA | | |
|---|---|---|---|---|
| | | A | B | C |
| EXAMPLE 1 | PROCESS TARGET BLOCK / RIGHT ADJACENT BLOCK | CONNECTED | NOT CONNECTED | NOT CONNECTED |
| EXAMPLE 2 | PROCESS TARGET BLOCK / RIGHT ADJACENT BLOCK | CONNECTED | CONNECTED | NOT CONNECTED |
| EXAMPLE 3 | PROCESS TARGET BLOCK / RIGHT ADJACENT BLOCK | CONNECTED | CONNECTED | CONNECTED |

F I G. 2 1
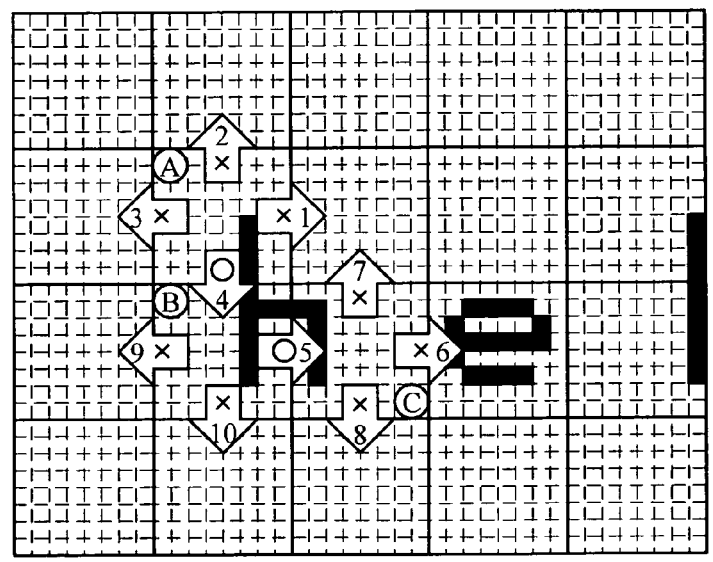

STORAGE MEDIUM HAVING STORED THEREON IMAGE PROCESSING PROGRAM AND IMAGE PROCESSING APPARATUS

CROSS REFERENCE TO RELATED APPLICATION

The disclosure of Japanese Patent Application No. 2008-227515, filed Sep. 4, 2008, is incorporated herein by reference.

BACKGROUND AND SUMMARY

Technical Field

The technology presented herein relates to a storage medium having stored thereon an image processing program, and an image processing apparatus, and more particularly relates to a storage medium having stored thereon an image processing program and an image processing apparatus which are capable of deleting a displayed image.

Description of the Background Art

Conventionally, as disclosed in Japanese Laid-Open Patent Publication No. 2006-167192 (hereinafter referred to as patent document 1), for example, various apparatuses have been developed, which delete displayed images in accordance with an operation by a user. According to a game apparatus disclosed in patent document 1, a hand-drawn image is displayed in accordance with a handwriting input by a player. In the game apparatus, when the player performs a predetermined delete operation, the displayed hand-drawn image is deleted. For example, when the player operates an all-delete button, types of lines forming the displayed hand-drawn image are changed to wavy lines, and colors of the hand-drawn image are also changed (for example, to pale colors).

However, in the game apparatus disclosed in the above-described patent document 1, a hand written-image is deleted only by changing the lines types and the colors of hand-drawn image as a whole. Therefore, even if the user performs the delete operation, no artistic effect in response to the operation is exerted, and thus no event is taken place in response to the operation. Therefore, the user does not find any enjoyment in the delete operation, and consequently, the delete operation for deleting a hand-drawn image is regarded as a mere monotonous operation. That is, in the game apparatus disclosed in the above-described patent document 1, the hand-drawn image is processed as a whole in accordance with the user operation (delete operation), and thus it is difficult to obtain a novel artistic presentation of the hand-drawn image.

Therefore, a feature of an example embodiment presented herein is to provide an image processing program and an image processing apparatus which are capable of processing an image displayed based on a user operation, by adding a novel artistic presentation effect to the image when the processing is performed based on the user operation.

The present embodiment has the following features to attain the above. It is noted that reference characters, step numbers, and supplementary explanations in parentheses are merely provided to facilitate the understanding of the present embodiment.

A first aspect is directed to a computer-readable storage medium having stored thereon an image processing program executed by a computer (31) of an apparatus for performing predetermined processing on an image (Ihw, Ist) generated in accordance with an output from the pointing device (13). The image processing program causes the computer to function as image generation means (CPU 31 executing step 54, hereinafter denoted by the step number only), image display control means (S54), and image change control means (S56, S57). The image generation means generates an input image (Ihw, Ist) in accordance with the output from the pointing device. The image display control means displays the input image generated by the image generation means on display means (12). The image change control means disassembles the input image generated by the image generation means into a plurality of partial image (Ihw1 to Ihw5, Istn), and changes at least one of a display position and a display form of each of the partial images. The pointing device is an input device designating a input position or a coordinate point on a screen, and may be realized by a system and the like which detects a position on the screen which is pointed at by using a touch panel, a mouse, a track pad, a trackball, a graphics tablet, a joystick or a housing of a game controller. Further, to change the display position or the display form includes processes of causing the disassembled partial images to move, changing (enlarging, and downsizing, for example) a shape of each of the disassembled partial images, changing (rotating) a display direction of each of the disassembled partial images, changing a color of each of the disassembled partial images, causing each of the disassembled partial images to blink, and changing the degree of transparency of each of the disassembled partial images. The process of changing the display position or the display form may be performed with respect to a part of the input image, instead of an entirety of the input image.

In a second aspect, when the user performs a delete operation, the image change control means changes a partial image which is a target of the delete operation, displays the changed partial image on the display means, and deletes the displayed changed partial image, which is the target of the deletion operation, from the display screen. The partial image, which is the target of the deletion operation, may be the entirety of the input image, or may be a part of the input image.

In a third aspect, the image change control means divides (S71) a display area of the input image into blocks each composed of a plurality of pixels, and disassembles the input image into the plurality of partial images in block units.

In a fourth aspect, the computer is further caused to function as continuity determination means (S76, S94, S114, S134, S153). The contiguity determination means determines continuous portions in the input image. In accordance with determination by the continuity determination means, the image change control means disassembles the input image into the plurality of partial images such that the continuous portions belong to a common one of the partial images.

In a fifth aspect, the image change control means divides a display area of the input image into blocks each composed of a plurality of pixels, and disassembles the input image into the plurality of partial images in block units. The continuity determination means determines that blocks are continuous when the input image extends continuously over the blocks. The image change control means further disassembles, in accordance with the determination by the continuity determination means, the input image into the plurality of partial images such that the continuous blocks belong to a common one of the partial images.

In a sixth aspect, when the input image is included in a bordering area of either one of two adjacent blocks, the continuity determination means determines that the two blocks are continuous to each other (FIG. 20, determination criteria A).

In a seventh aspect, when the input image is included in bordering areas of two adjacent blocks, the continuity determination means determines that the two blocks are continuous to each other (FIG. 20, determination criteria B).

In an eighth aspect, the continuity determination means further determines whether or not the input image included in the bordering area of either one of the two adjacent blocks and the input image included in the bordering area of the other one of the two adjacent blocks are continuous to each other, and concludes that the two adjacent blocks are continuous to each other when the input images are continuous to each other (FIG. 20, determination criteria C).

In a ninth aspect, the continuity determination means determines whether or not an adjacent block, which is adjacent to one block and is determined to be continuous to the one block, is continuous to another block, which is adjacent to the adjacent block, and concludes, in the case of the adjacent block and the another block being continuous, that the one block, the adjacent block and the another block are continuous to one another (FIG. 12 to FIG. 16).

In a tenth aspect, the image change control means provides a common moving speed in a common moving direction to respective element images composing each of the partial images, and changes a display position of each of the partial images.

In an eleventh aspect, the image change control means provides a common moving speed in a common moving direction to the blocks which are determined by the continuity determination means to be continuous to each other, and changes a display position of each of the partial images (FIG. 23A).

In a twelfth aspect, the apparatus includes imaging means (23, 25) for capturing an image of surroundings of the apparatus. The image display control means displays a captured image captured by the imaging means on the display means in real time, overlaps the input image generated by the image generation means on the captured image, and displays a resultant image on the display means.

In a thirteenth aspect, the image generation means generates a hand-drawn image (Ihw) in accordance with the output from the pointing device.

In a fourteenth aspect based on the first aspect, the image generation means generates a predetermined synthesis image (Ist) to be displayed at a position based on the output from the pointing device.

In a fifteenth aspect, the image generation means generates a second input image in accordance with an output from the pointing device after a first input image is generated. The image display control means synthesizes and displays the first input image and the second input image. The image change control means treats an image obtained by synthesizing the first input image and the second input image as one image, and disassembles the synthesized image.

In a sixteenth aspect, when the user performs an all-delete operation, the image change control means disassembles an entirety of the input image into the plurality of partial images, changes at least one of the display position and the display form of each of the plurality of partial images so as to be displayed on the display means, and deletes all the displayed partial images from the display screen.

In a seventeenth aspect, the image change control means causes the partial images to move to different display positions, respectively, and displays the partial images on the display means.

In an eighteenth aspect, the image change control means causes each of the partial images to move to the outside of the display screen, and deletes the partial images from the display screen.

In a nineteenth aspect, the image change control means provides initial speeds in different directions to the plurality of partial images, respectively, also provides acceleration in a predetermined common direction to the partial images, and deletes the partial images from the display screen.

In a twentieth aspect, the pointing device is a touch panel which covers a display screen of the display means.

In a twenty-first aspect, the image change control means disassembles the input image generated by the image generation means in accordance with respective colors of the input image.

In a twenty-second aspect, the computer is further caused to function as input position history storage control means. The input position history storage control means stores, in a memory (32), a history of input positions corresponding to the output from the pointing device. In accordance with the history of the input positions, the image change control means disassembles the input image generated by the image generation means into partial images each composed of such input positions that are continuous, among the input positions used by the image generation means for generating the input image.

In a twenty-third aspect, the image change control means disassembles the input image generated by the image generation means in a predetermined mesh shape.

In a twenty-fourth aspect, the image change control means displays the disassembled partial images on the display means by rotating each of the disassembled partial images.

In a twenty-fifth aspect, the image change control means displays the disassembled partial images on the display means by enlarging or downsizing each of the disassembled partial images.

In a twenty-sixth aspect, the image change control means displays the disassembled partial images on the display means by changing colors of each of the disassembled partial images.

In a twenty-seventh aspect, the image change control means displays the disassembled partial images on the display means by causing each of the disassembled partial images to blink.

A twenty-eighth aspect is directed to an image processing apparatus performing predetermined processing on an image generated in accordance with an output from a pointing device. The image processing apparatus includes image generation means, image display control means, and image change control means. The image generation means generates an input image in accordance with the output from the pointing device. The image display control means displays the input image generated by the image generation means on display means. The image change control means disassembles the input image generated by the image generation means into a plurality of partial images, and changes at least one of a display position and a display form of each of the partial images.

According to the above-described first aspect, at least one of the display position and the display form of each of the partial images is changed, the partial images being obtained by disassembling the input image displayed based on the user operation. Therefore, it is possible to process the input image by adding a novel artistic presentation effect to the input image.

According to the above-described second aspect, when the input image displayed based on the user operation undergoes a partial-delete process or an all-delete process in accordance with a partial-delete operation or all-delete operation by the user, each of the partial images is deleted after at least one of the display position and the display form of each partial image is changed. Therefore, it is possible to delete the input image by adding a novel artistic presentation effect to the input image.

According to the above-described third aspect, the image is disassembled in block units, which is larger than pixel units, and thus it is possible to reduce a load of a process for disassembling the image.

According to the above-described fourth aspect, when the input image displayed on the user operation is processed, it is possible to add a novel artistic presentation effect to respective continuous parts of the disassembled image.

According the above-described fifth aspect, the continuous parts are determined in block units, which is larger than pixel units, and thus, it is possible to reduce a load of a continuity determination process.

According to the above-described sixth to eighth aspects, when connection between adjacent blocks is determined, only pixels in bordering areas are used to allow an accurate continuity determination. Further, when respective determination criteria based on the above-described sixth to eighth aspects are used, results of the continuity determination between blocks vary. Therefore, by using appropriate one of the determination criteria, it is possible to adjust a load or accuracy of the process for disassembling the input image.

According to the ninth aspect, a recursive process is repeated, whereby a group of blocks which are connected in various manners is determined accurately.

According to the above-described tenth aspect, it is possible to move the image in partial image units, even if each of the partial images composed of element images is not regarded as one object.

According to the above-described eleventh aspect, it is possible to move the image in group units, even if a plurality of blocks included in a common group are not regarded as one object.

According to the above-described twelfth to fourteenth aspects, it is possible to add a hand-drawn line, a hand-drawn character, a hand-drawn mark (symbol, or stamp), and the like, which are made by the user, onto the captured image.

According to the above-described fifteenth aspect, it is possible to perform the image disassembling process and the artistic image presentation process, in a similar manner, regardless of the number of images generated by the user.

According to the above-described sixteenth aspect, it is possible to perform all deletion in accordance with the all-delete operation by the user.

According to the above-described seventeenth to nineteenth aspects, it is possible to perform the artistic image presentation in which each of the partial images are moved in various directions and then deleted.

According to the above-described twentieth aspect, it is possible to allow the user to perform an intuitive operation by using the touch panel.

According to the above-described twenty-first to twenty-third aspects, an image generated based on the user operation is disassembled into various units of partial images, and the image is processed by adding a novel artistic presentation effect to the partial images.

According to the twenty-fourth to twenty-seventh aspects, it is possible to process the input image by adding various artistic presentation effects to the partial images.

According to the image processing apparatus of the present embodiment, it is possible to obtain the same effect as that of exerted by the above-described storage medium having the image processing program stored thereon.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 4 is a diagram showing a first step of an exemplary artistic presentation on the lower LCD 12 when a user performs an all-delete operation with respect to hand-drawn characters Ihw;

FIG. 10 is a diagram showing an example of block data Db stored in the main memory 32;

FIG. 16 is a subroutine showing, in detail, an operation of a lower adjacent block checking process performed in step 84 and the like;

FIG. 17 is a diagram showing an exemplary display screen DA which is divided into lattice-shaped blocks composed of m rows×n columns;

FIG. 20 is a diagram showing an exemplary determination result of the connection relations between the blocks in accordance with determination criteria A to C;

FIG. 21 is a diagram showing an example of a hand-drawn image disassembled by the image disassembling process;

DESCRIPTION OF THE PREFERRED EMBODIMENTS

Figure 1:
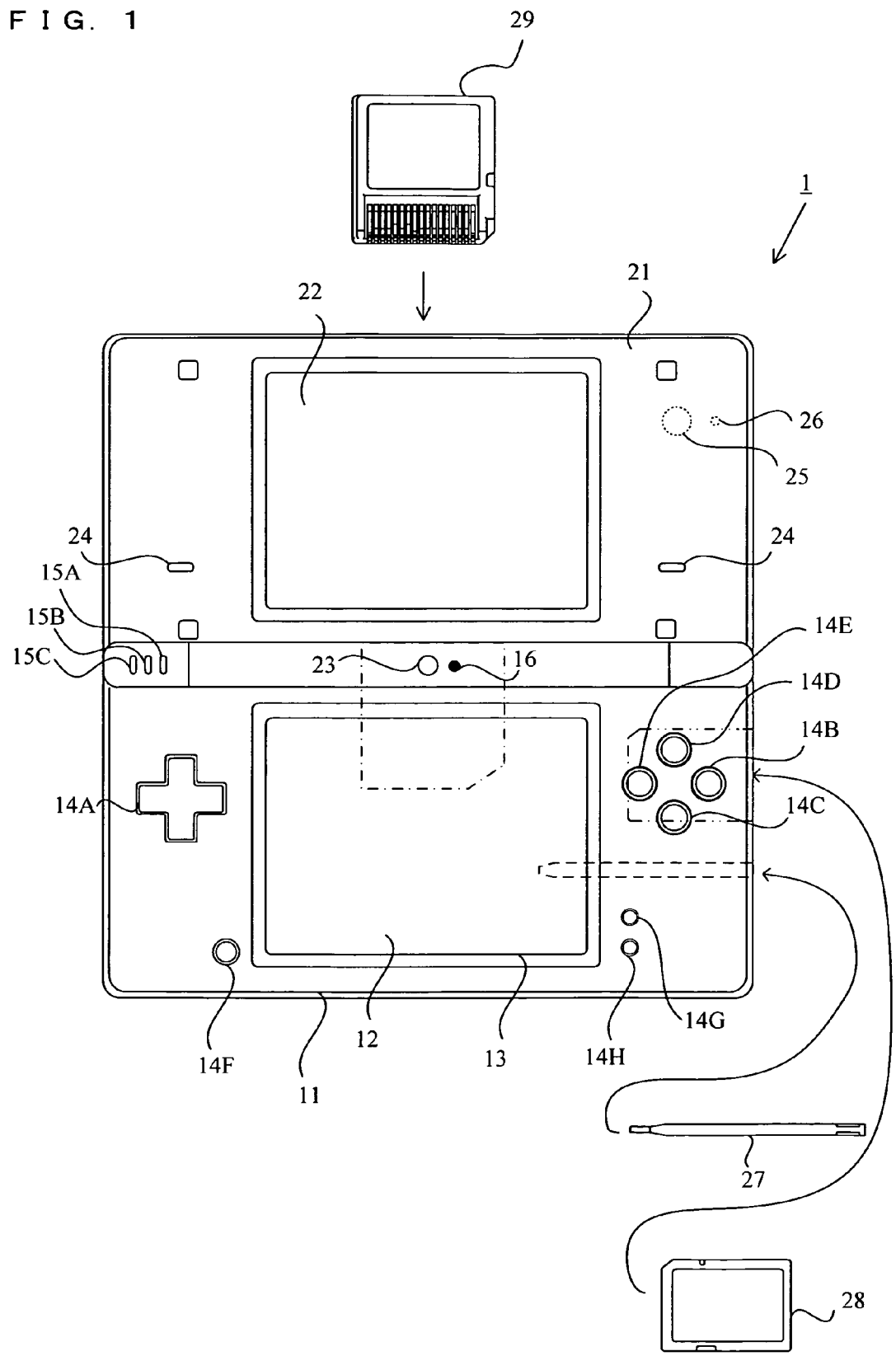
FIG. 1 is an outer appearance of a game apparatus 1 executing an image processing program according to an embodiment.

With reference to drawings, an image processing apparatus executing an image processing program according to an embodiment will be described. The image processing program of the present embodiment becomes applicable when executed by any computer system. Here, by using a game apparatus 1 as an exemplary image processing apparatus, the image processing program executed by the game apparatus 1 will be described. FIG. 1 is an outer appearance of the game apparatus 1 executing the image processing program of the present invention. As an exemplary game apparatus 1, a hand-held game apparatus is shown. The game apparatus 1 has cameras embedded therein, thereby functioning as an imaging apparatus which is capable of capturing images by using the cameras, displaying the captured images on a screen, and saving data of the captured images. In the present description, capturing image data by using the cameras is referred to as imaging (or capturing an image), whereas saving the captured image data is referred to as photographing (an image).

In FIG. 1, the game apparatus 1 is a foldable hand-held game apparatus, and is in an opened state. The game apparatus 1 is configured to have such a size as to be held by a user with both hands or one hand even in the opened state.

The game apparatus 1 includes a lower housing 11 and an upper housing 21. The lower housing 11 and the upper housing 21 are connected to each other so as to be capable of being opened or closed (foldable). In an example of FIG. 1, the lower housing 11 and the upper housing 21 are each formed in a plate-like shape of a horizontally long rectangle, and foldably connected to each other at long side portions thereof. Usually, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state due to frictional force generated at a connection portion and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. It is noted that although an LCD is used as a display device provided in the game apparatus 1 in the present embodiment, any other display devices such as a display device using an EL (Electro Luminescence) may be used. In addition, the game apparatus 1 can use a display device of any resolution.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14F is used for turning the power of the game apparatus 1 ON/OFF. In the example shown in FIG. 1, the direction input button 14A and the power button 14F are provided on the inner main surface of the lower housing 11, and on one of a left side and a right side (on the left side in FIG. 1) of the lower LCD 12 which is provided substantially at a central portion of the inner main surface of the lower housing 11. The operation buttons 14B to 14E, the start button 14G, and the select button 14H are also provided on the inner main surface of the lower housing 11 and on the other one of the left side and the right side (on the right side in FIG. 1) of the lower LCD 12. The direction input button 14A, the operation buttons 14B to 14E, the start button 14G, and the select button 14H are used for performing various operations on the game apparatus 1.

It is noted that the operation buttons 14I to 14K are omitted in FIG. 1. For example, an L button 14I is provided at a left end of an upper side surface of the lower housing 11, and the R button 14J is provided at a right end of the upper side surface of the lower housing 11. The L button 14I and the R button 14J are used, for example, for performing a photographing instruction operation (a shutter operation) on the game apparatus 1. In addition, the volume button 14K is provided on the left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted so as to cover a screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as the lower LCD 12. However, the resolution of the touch panel 13 and the resolution of the lower LCD 12 is not necessarily the same as each other. In the right side surface of the lower housing 11, an insertion opening (a dotted line shown in FIG. 1) for a stylus pen 27 is provided. The insertion opening is capable of accommodating the stylus pen 27 which is used for performing an operation with respect to the touch panel 13. Although an input to the touch panel 13 is usually performed by using the stylus pen 27, a finger of the user may be used for operating the touch panel 13 instead of the stylus pen 27.

In the right side surface of the lower housing 11, an insertion slot (indicated by a two-dot chain line in FIG. 1) is provided for accommodating a memory card 28. Inside the insertion slot, a connector (not shown) is provided for electrically connecting the game apparatus 1 to the memory card 28. The memory card 28 is, for example, an SD (Secure Digital) memory card, and is detachably mounted to the connector. The memory card 28 is used, for example, for storing (saving) an image captured by the game apparatus 1, and loading an image generated on another apparatus into the game apparatus 1.

Further, in the upper side surface of the lower housing 11, an insertion slot (indicated by a chain line in FIG. 1) is provided for accommodating a memory card 29. Inside the insertion slot, a connecter (not shown) is provided for electrically connecting the game apparatus 1 to the memory card 29. The memory card 29 is a storage medium having stored thereon an image processing program, game program, and the like, and is detachably mounted in the insertion slot provided in the lower housing 11.

Three LEDs 15A to 15C are mounted to a right side part of the connection portion where the lower housing 11 and the upper housing 21 are connected to each other. The game apparatus 1 is capable of performing wireless communication with another apparatus, and the first LED 15A is lit up while wireless communication is established. The second LED 15B is lit up while the game apparatus 1 is charged. The third LED 15C is lit up while the power of the game apparatus 1 is ON. Thus, by the three LEDs 15A to 15C, a state of communication establishment of the game apparatus 1, a state of charge of the game apparatus 1, and a state of ON/OFF of the power of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. As with the lower LCD 12, a display device of another type having any resolution may be used instead of the upper LCD 22. For example, a touch panel may be provided so as to cover the upper LCD 22.

In the upper housing 21, two cameras (an inner camera 23 and an outer camera 25) are provided. As shown in FIG. 1, the inner camera 23 is mounted in an inner main surface of the upper housing 21 and adjacent to the connection portion. On the other hand, the outer camera 25 is mounted in a surface opposite to the surface in which the inner camera 23 is mounted, namely, in an outer main surface of the upper housing 21 (which is a surface located on the outside of the game apparatus 1 in the closed state, and a back surface of the upper housing 21 shown in FIG. 1). In FIG. 1, the outer camera 25 is indicated by a dashed line. Thus, the inner camera 23 is capable of capturing an image in a direction in which the inner main surface of the upper housing 21 faces, and the outer camera 25 is capable of capturing an image in a direction opposite to an imaging direction of the inner camera 23, namely, in a direction in which the outer main surface of the upper housing 21 faces. In this manner, in the present embodiment, the inner camera 23 and the outer camera 25 are provided such that the imaging directions thereof are opposite to each other. For example, the user can capture an image of a view as viewed from the game apparatus 1 toward the user with the inner camera 23 as well as an image of a view as viewed from the game apparatus 1 in a direction opposite to the user with the outer camera 25. The lower LCD 12 and/or the upper LCD 22 may be used for displaying an image captured by the inner camera 23 or the outer camera 25 in real time.

In the inner main surface, a microphone (microphone 43 shown in FIG. 2) is accommodated as a voice input device in the vicinity of the connection portion. In the inner main surface, microphone hole 16 is formed in the vicinity of the connection portion so as to allow the microphone 43 to detect sound outside the game apparatus 1. The accommodating position of the microphone 43 and the position of the microphone hole 16 are not necessarily in the vicinity of the connection portion. For example, the microphone 43 may be accommodated in the lower housing 11, and the microphone hole 16 may be provided in the lower housing 11 so as to correspond to the accommodating position of the microphone 43.

In the outer main surface of the upper housing 21, a fourth 4 LED 26 (indicated by a dashed line in FIG. 1) is mounted. The fourth LED 26 is lit up while photographing is performed with the inner camera 23 or the outer camera 25. Further, the fourth LED 26 may be caused to blink while moving images are captured with the inner camera 23 or the outer camera 25 (while the captured images are stored as the moving images). In order to prevent the LED from reflecting on the screen, the fourth LED 26 may be turned off immediately after the shutter is pressed and until a time when an image captured by pressing the shutter has been completely stored. With the fourth LED 26, a target person who is (being) photographed and people around the target person are notified that photographing is performed by the game apparatus 1.

Sound holes 24 are formed in the inner main surface of the upper housing 21 and situated on left and right sides of the upper LCD 22 which is provided substantially at a central portion of the inner main surface of the upper housing 21. The speakers are accommodated in the upper housing 21 and at the back of the sound holes 24. The sound holes 24 are holes for releasing sound from the speakers therethrough.

As above described, provided in the upper housing 21 are the inner camera 23 and the outer camera 25 which are components for capturing an image, and the upper LCD 22 which is display means for displaying various images. On the other hand, provided in the lower housing 11 are the input devices (the touch panel 13 and the buttons 14A to 14K) for performing operation inputs on the game apparatus 1, and the lower LCD 12 which is display means for displaying various images. For example, when using the game apparatus 1, the user can hold the lower housing 11 and perform an input with respect to the input device while displaying a captured image (an image captured by the camera) on the lower LCD 12 or the upper LCD 22.

Figure 2:
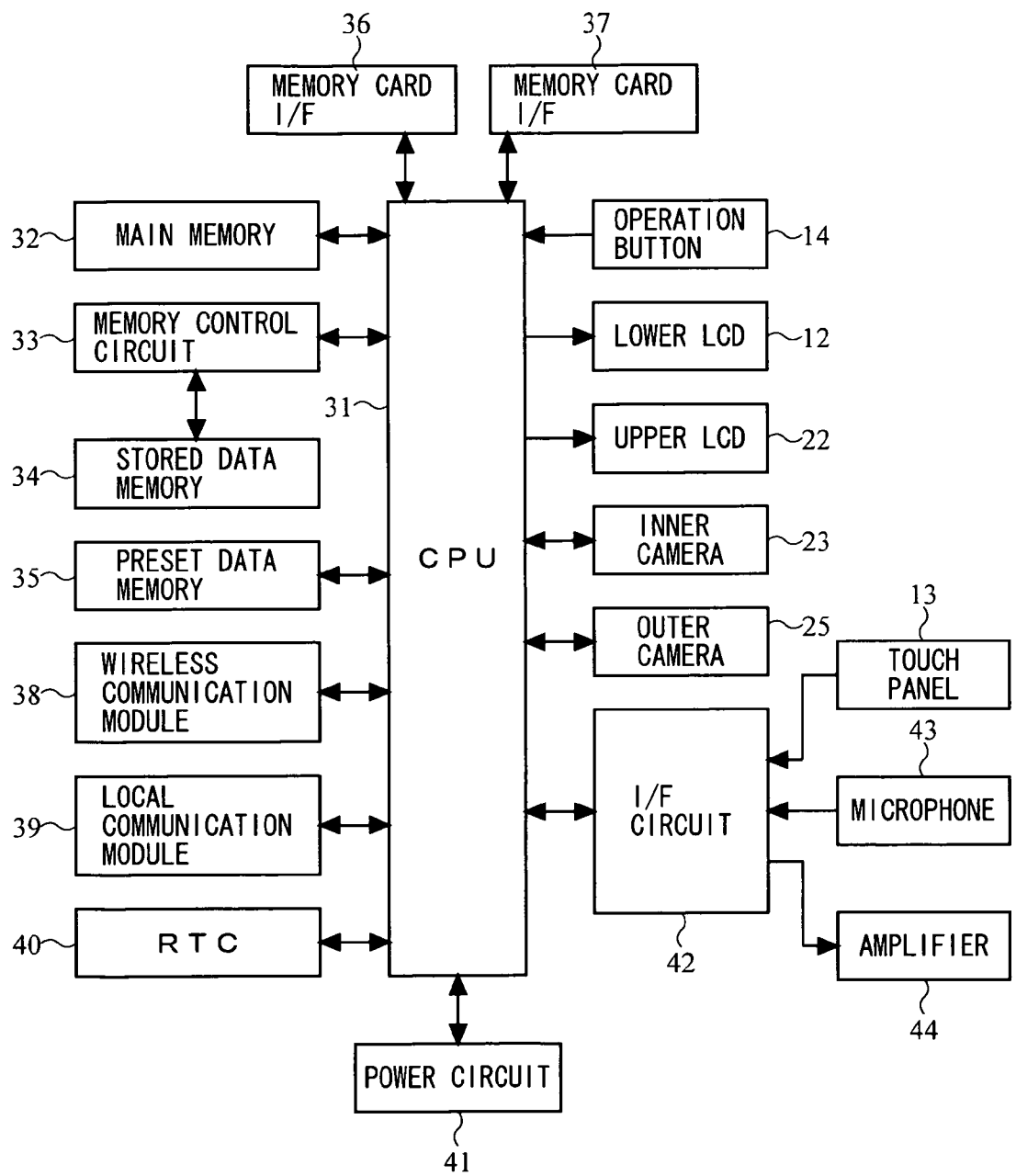
FIG. 2 is a block diagram showing an example of an internal configuration of the game apparatus 1 shown in FIG. 1.

With reference to FIG. 2, an internal configuration of the game apparatus 1 will be described. FIG. 2 is a block diagram showing an example of the internal configuration of the game apparatus 1.

As shown in FIG. 2, the game apparatus 1 includes electronic components such as a CPU 31, a main memory 32, a memory control circuit 33, a stored data memory 34, a preset data memory 35, memory card interfaces (memory card I/Fs) 36 and 37, a wireless communication module 38, a local communication module 39, a real time clock (RTC) 40, a power circuit 41, and an interface circuit (I/F circuit) 42. These electronic components are mounted on an electronic circuit substrate and accommodated in the lower housing 11 (or may be accommodated in the upper housing 21).

The CPU 31 is information processing means for executing a predetermined program. In the present embodiment, the predetermined program is stored in a memory (e.g., the stored data memory 34) within the game apparatus 1 or in the memory cards 28 and/or 29, and the CPU 31 executes the predetermined program, thereby executing the information processing described later. It is noted that the program executed by the CPU 31 may be stored in advance in a memory within the game apparatus 1, may be obtained from the memory cards 28 and/or 29, or may be obtained from another apparatus by means of communication with the another apparatus.

The main memory 32, the memory control circuit 33, and the preset data memory 35 are connected to the CPU 31. The stored data memory 34 is connected to the memory control circuit 33. The memory 32 is storage means used as a work area and as a buffer area of the CPU 31. In other words, the main memory 32 stores therein various data used in the information processing, and also stores a program obtained externally (from the memory card 28 and 29, another apparatus, and the like). In the present embodiment, for example, a PSRAM (Pseudo-SRAM) may be used as the main memory 32. The stored data memory 34 is storage means for storing the program executed by the CPU 31, and data of images captured by the inner camera 23 and the outer camera 25, and the like. The stored data memory 34 is composed of a nonvolatile storage means, and is composed of a NAND flash memory in the present embodiment, for example. The memory control circuit 33 is a circuit for controlling reading of data from the stored data memory 34 and writing of data to the stored data memory 34 in accordance with an instruction from the CPU 31. The preset data memory 35 is storage means for storing data (preset data) of various parameters, which are set in advance on the game apparatus 1, and the like. A flash memory connected to the CPU 31 via an SPI (Serial Peripheral Interface) bus can be used as the preset data memory 35.

The memory card I/Fs 36 and 37 are connected to the CPU 31, respectively. The memory card I/F 36 reads data from and writes data to the memory card 28, which is mounted to the connector, in accordance with an instruction from the CPU 31. The memory card I/F 37 reads data from and writes data to the memory card 29, which is mounted to the connector, in accordance with an instruction from the CPU 31. In the present embodiment, image data captured by the inner camera 23 or the outer camera 25, and image data received from another apparatus are written to the memory card 28, whereas images stored in the memory card 28 are read from the memory card 28 and are stored in the stored data memory 34. Various programs stored in the memory card 29 are written by the CPU 31 to be executed.

The image processing program of the present invention may be supplied to a computer system not only from an external storage medium such as the memory card 29 but also via a wired or wireless communication line. The image processing program may be stored in advance in a nonvolatile storage unit within the computer system. An information storage medium for storing the image processing program is not limited to the above nonvolatile storage unit, but may be a CD-ROM, a DVD or an optical disc-shaped storage medium similar thereto.

The wireless communication module 38 functions to connect to a wireless LAN, for example, by a method conformed to the standard of IEEE802.11.b/g. The local communication module 39 functions to wirelessly communicate with a game apparatus of the same type by a predetermined communication method. The wireless communication module 38 and the local communication module 39 are connected to the CPU 31. The CPU 31 is capable of receiving data from and sending data to another apparatus via the Internet using the wireless communication module 38, and also capable of receiving data from and sending data to another game apparatus of the same type using the local communication module 39.

The RTC 40 and the power circuit 41 are connected to the CPU 31. The RTC 40 counts a time, and outputs the time to the CPU 31. For example, the CPU 31 is capable of calculating a current time (date) and the like based on the time counted by the RTC 40. The power circuit 41 controls electric power from a power supply (typically, a battery accommodated in the lower housing 11) of the game apparatus 1 to supply the electric power to each of the electronic components of the game apparatus 1.

The game apparatus 1 includes the microphone 43 and an amplifier 44. The microphone 43 and the amplifier 44 are connected to the I/F circuit 42. The microphone 43 detects voice uttered by the user toward the game apparatus 1, and outputs a voice signal indicative of the voice to the I/F circuit 42. The amplifier 44 amplifies the voice signal from the I/F circuit 42 and causes the voice signal to be outputted from the speakers (not shown). The I/F circuit 42 is connected to the CPU 31.

The touch panel 13 is connected to the I/F circuit 42. The I/F circuit 42 includes a voice control circuit for controlling the microphone 43 and the amplifier 44 (speakers), and a touch panel control circuit for controlling the touch panel 13. The voice control circuit performs A/D conversion and D/A conversion with respect to the voice signal, and converts the voice signal into voice data in a predetermined format. The touch panel control circuit generates touch position data in a predetermined format in accordance with a signal from the touch panel 13, and outputs the touch position data to the CPU 31. For example, the touch position data is data indicative of a coordinate point of a position on an input surface of the touch panel 13 at which an input is performed. The touch panel control circuit reads a signal from the touch panel 13 and generates touch position data every predetermined time period. The CPU 31 is capable of recognizing a position on the touch panel 13 at which an input is performed by obtaining the touch position data via the I/F circuit 42.

The operation buttons 14 are composed of the operation buttons 14A to 14K, and are connected to the CPU 31. Each of the operation buttons 14 outputs, to the CPU 31, operation data indicative of an input state with respect to each of the operation buttons 14A to 14K (whether or not each button is pressed). The CPU 31 obtains the operation data from the operation buttons 14, and executes a process corresponding to an input performed with respect to each of the operation buttons 14.

The inner camera 23 and the outer camera 25 are connected to the CPU 31. Each of the inner camera 23 and the outer camera 25 captures an image in accordance with an instruction from the CPU 31, and outputs data of the captured image to the CPU 31. For example, the CPU 31 gives an imaging instruction to either of the inner camera 23 and the outer camera 25, and the camera having received the imaging instruction captures an image and sends the image data to the CPU 31.

The lower LCD 12 and the upper LCD 22 are connected to the CPU 31. Each of the lower LCD 12 and the upper LCD 22 displays an image in accordance with an instruction from the CPU 31. For example, the CPU 31 displays an image obtained from either of the inner camera 23 and the outer camera 25 on either of the lower LCD 12 and the upper LCD 22, and also displays an operation explanation screen, which is generated by predetermined processing, on the other one of the lower LCD 12 and the upper LCD 22.

Figure 3:
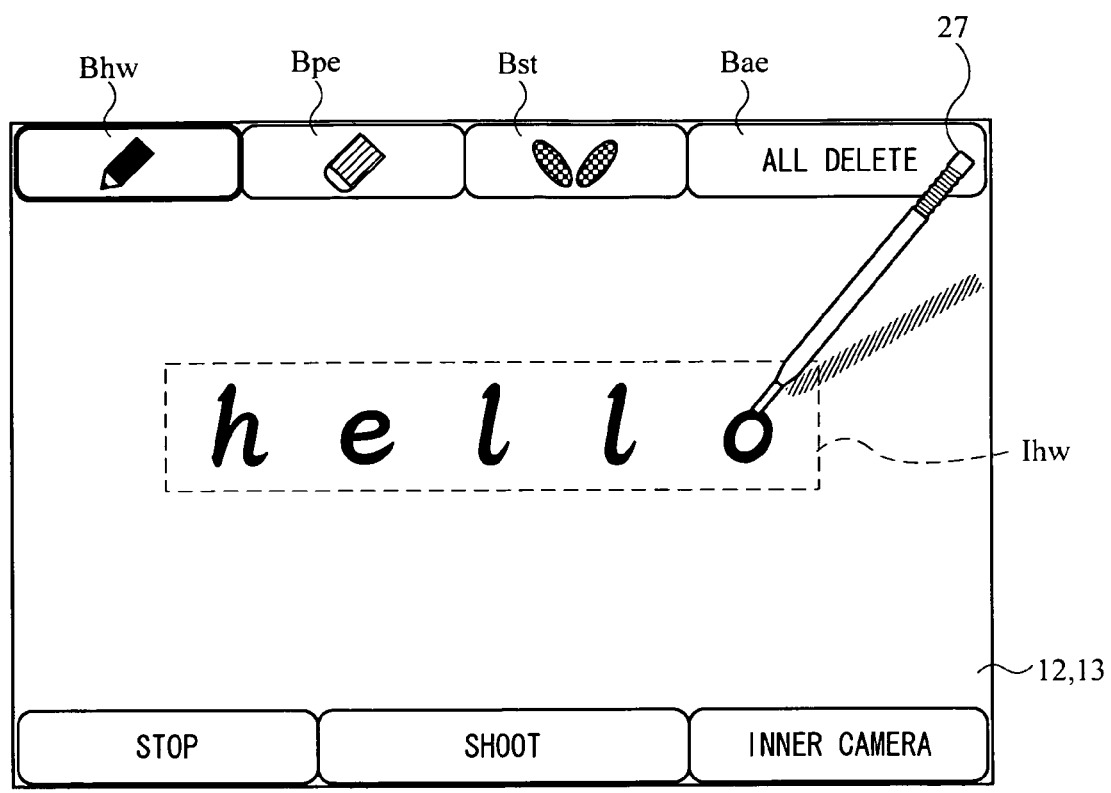
FIG. 3 is a diagram showing exemplary hand-drawn characters displayed on a lower LCD 12.
Figure 5:
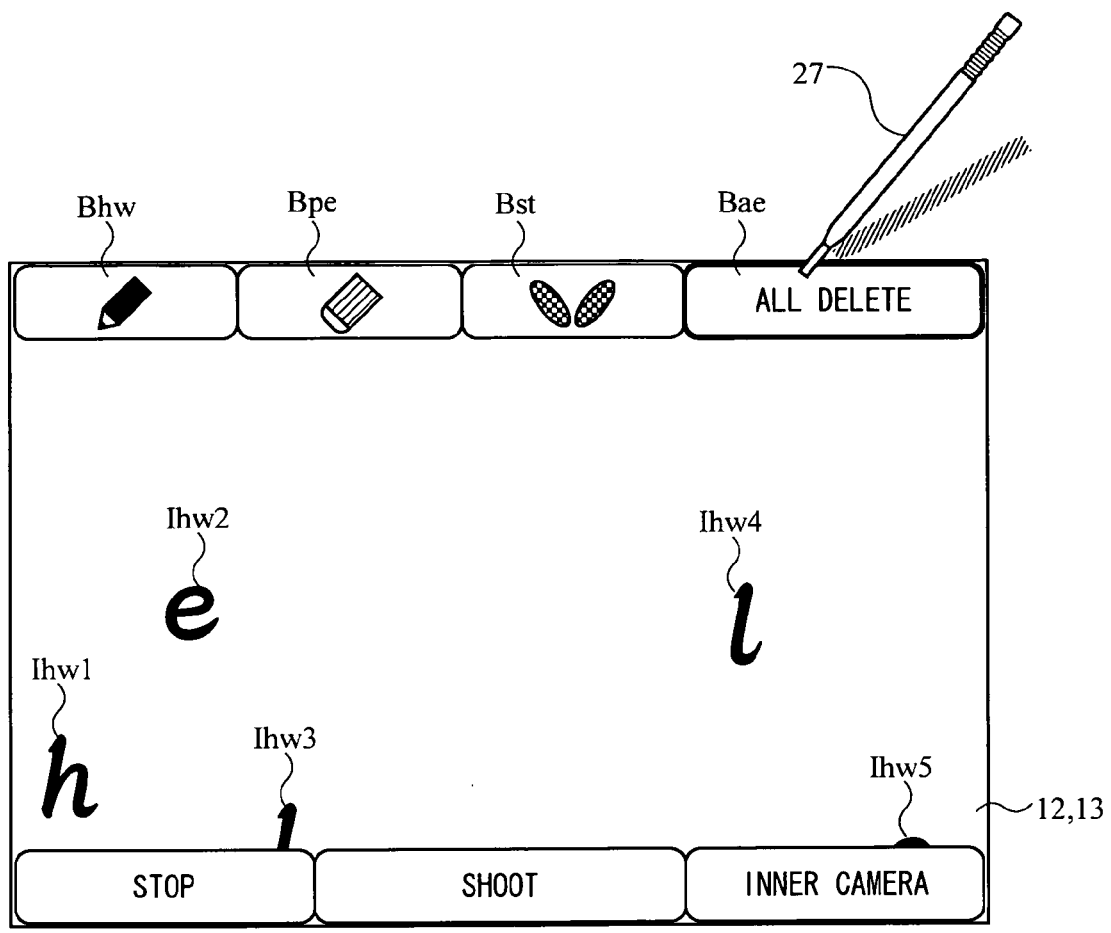
FIG. 5 is a diagram showing a second step of the exemplary artistic presentation on the lower LCD 12 when the user performs the all-delete operation with respect to the hand-drawn characters Ihw.
Figure 6:
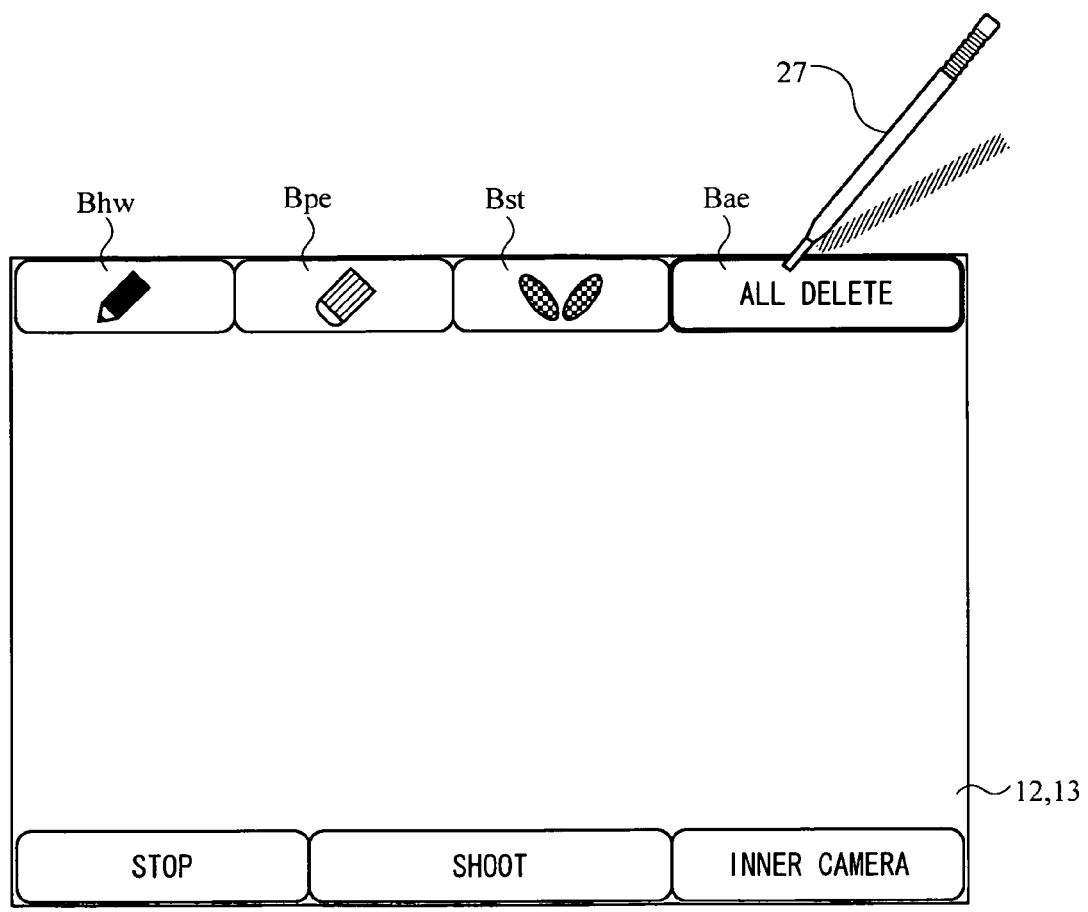
FIG. 6 is a diagram showing a third step of the exemplary artistic presentation on the lower LCD 12 when the user performs the all-delete operation with respect to the hand-drawn characters Ihw.
Figure 7:
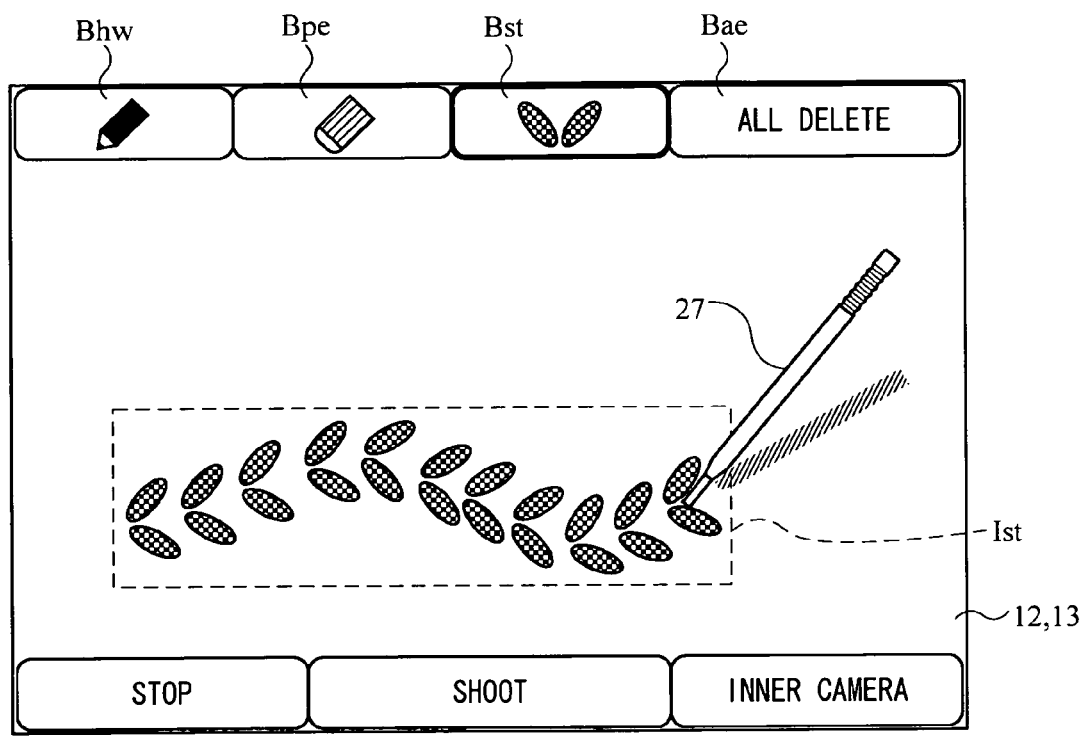
FIG. 7 is a diagram showing exemplary hand-drawn stamps Ist displayed on the lower LCD 12.
Figure 8:
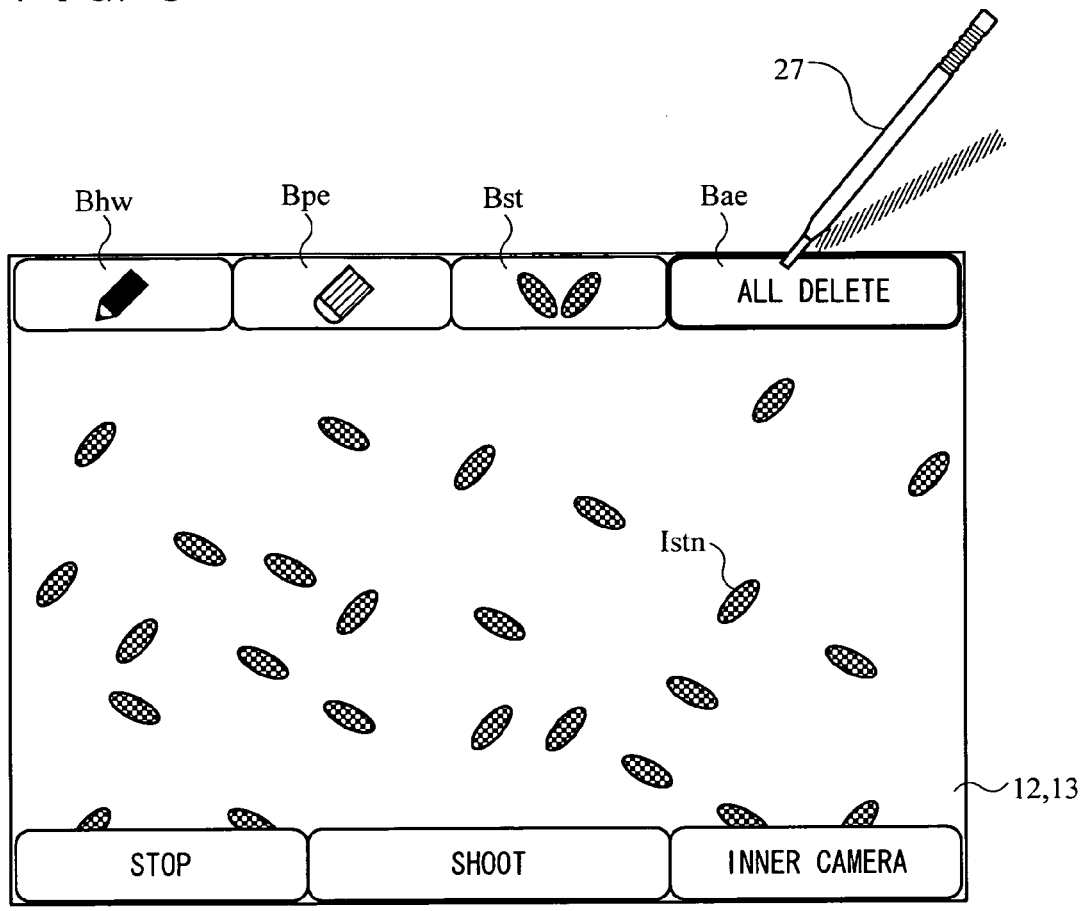
FIG. 8 is a diagram showing an exemplary artistic presentation on the lower LCD 12 when the user performs the all-delete operation with respect to the hand-drawn stamps Ist.

Next, prior to describing a specific processing operation of the image processing program executed on the game apparatus 1, an exemplary display form displayed on the lower LCD 12 by the processing operation will be described with reference to FIG. 3 to FIG. 8. FIG. 3 is a diagram showing exemplary hand-drawn characters Ihw displayed on the lower LCD 12. FIG. 4 is a diagram showing a first step of an exemplary artistic presentation on the lower LCD 12 when the user performs an all-deletion operation with respect to the hand-drawn characters Ihw. FIG. 5 is a second step of the exemplary artistic presentation on the lower LCD 12 when the user performs the all-delete operation with respect to the hand-drawn characters Ihw. FIG. 6 is a diagram showing a third step of the exemplary artistic presentation on the lower LCD 12 when the user performs the all-delete operation with respect to the hand-drawn characters Ihw. FIG. 7 is a diagram showing the exemplary hand-drawn stamps Ist displayed on the lower LCD 12. FIG. 8 is a diagram showing the exemplary artistic presentation on the lower LCD 12 when the user performs the all-delete operation with respect to the hand-drawn stamps Ist.

As shown in FIG. 3, it is possible to draw hand-drawn characters, hand-drawn stamps Ist (symbol), and the like on the lower LCD 12 along a trajectory made by the user touching the touch panel 13 with the stylus pen 27. For example, on the lower LCD 12, a hand-drawn line draw button Bhw, a partial-delete button Bpe, a hand-drawn stamp draw button Bst, all-delete button Bae, and the like are displayed. When the user performs the touch operation to select a desired button, then all deletion, drawing corresponding to a touch operation, or partial deletion is performed in accordance with the selected button.

In FIG. 3, the user selects the hand-drawn line draw button Bhw, and a free line along the trajectory of the touch operation is drawn on the lower LCD 12. That is, when the user performs the touch operation on the touch panel 13 such that the user draws desired characters, characters corresponding to the touch operation can be drawn on the lower LCD 12. For example, displayed in the example shown in FIG. 3 are hand-drawn characters Ihw which are drawn along the trajectory of the touch operation performed by the user on the touch panel 13 with the stylus pen 27. Specifically, in the example, the user performs the touch operation on the touch panel 13 to manually input characters "hello", and the hand-drawn characters Ihw in which the last character "o" has been drawn are displayed on the lower LCD 12.

In FIG. 4, after the hand-drawn characters Ihw are drawn on the lower LCD 12, the user touches the all-delete button Bae. With the touch operation, the image (hand-drawn characters Ihw in the example shown in FIG. 4) manually inputted via the touch panel 13 is completely deleted. In this case in the present embodiment, during a time until the hand-drawn image (hand-drawn characters Ihw), a target of the all deletion, is completely deleted from the lower LCD 12, the hand-drawn image is disassembled and each piece of the disassembled image undergoes a predetermined artistic effect.

For example, in the example shown in FIG. 4, the hand-drawn characters Ihw are disassembled and divided into five individual hand-drawn characters Ihw1 to Ihw5, and the five hand-drawn characters move in various directions at various speeds independently of one another. In the example shown in FIG. 4, the hand-drawn characters Ihw are divided one by one. Specifically, the hand-drawn characters Ihw are disassembled into a hand-drawn character Ihw1 indicative of a first character "h", a hand-drawn character Ihw2 indicative of a second character "e", a hand-drawn character Ihw3 indicative of a third character "l", a hand-drawn character Ihw4 indicative of a fourth character "l", and a hand-drawn characters Ihw5 indicative of a fifth character "o".

Each of the disassembled hand-drawn characters Ihw1 to Ihw5 then moves downward in the lower LCD 12 as if free-falling (FIG. 5). Each of the hand-drawn characters Ihw1 to Ihw5 thereafter moves to the outside of the display range of the lower LCD 12, and is completely deleted from the lower LCD 12 (FIG. 6).

In FIG. 7, the user selects the hand-drawn stamps draw button Bst, and a group of stamps (symbols) are drawn on the lower LCD 12 along the trajectory made by the touch operation. For example, displayed in the example shown in FIG. 7 are the hand-drawn stamps Ist which are drawn along the trajectory of the touch operation performed by the user on the touch panel 13 with the stylus pen 27. Specifically, in the example, the user performs the touch operation on the touch panel 13 to manually input stamps each stamp being composed of a pair of two leaf-shaped figures. The stamps each composed of the pair of leaf-shaped figures are successively drawn one by one on the lower LCD 12 every predetermined time interval at predetermined distance intervals in accordance with the trajectory of the touch operation performed by the user. As a result, the stamps along the trajectory of the touch operation are displayed on the lower LCD 12 as the hand-drawn stamps Ist.

In FIG. 8, after the hand-drawn stamps Ist are drawn on the lower LCD 12, the user touches the all-delete button Bae. With the touch operation, the image (the hand-drawn stamps Ist in the example shown in FIG. 8) manually inputted via the touch panel 13 is completely deleted from the lower LCD 12. In this case as well, in the present embodiment, during a time until the hand-drawn image (hand-drawn stamps Ist), a target of the all deletion, is deleted from the lower LCD 12, the hand-drawn image is disassembled and divided, and the divided pieces of images undergo the predetermined artistic effect.

For example, in the example shown in FIG. 8, the hand-drawn stamps Ist is disassembled into n pieces of the hand-drawn stamps Istn, and n pieces of the hand-drawn stamps Istn move in various directions at various speeds independently of one another. In the example shown in FIG. 8, the hand-drawn stamps Ist drawn as a group of stamps are disassembled into each stamp composed of one pair of two leaf-shaped figures, and then each stamp composed of the pair of leaf-shapes figure is further disassembled into individual leaf-shaped figures.

Each of the disassembled hand-drawn stamps Istn then moves downward in the lower LCD 12 as if free-falling. Each of the hand-drawn stamps Istn moves to the outside of the display range of the lower LCD 12, and is completely deleted from the lower LCD 12.

As a background image on the lower LCD 12, a real-time image (captured image) captured by the inner camera 23 or the outer camera 25 may be displayed. In this case, the hand-drawn image (the hand-drawn characters Ihw, or the hand-drawn stamps Ist) is drawn on the captured image. That is, it is possible for the user to perform an operation of adding a desired hand-drawn image (scrawling) onto an image captured by the inner camera 23 or the outer camera 25.

Figure 9:
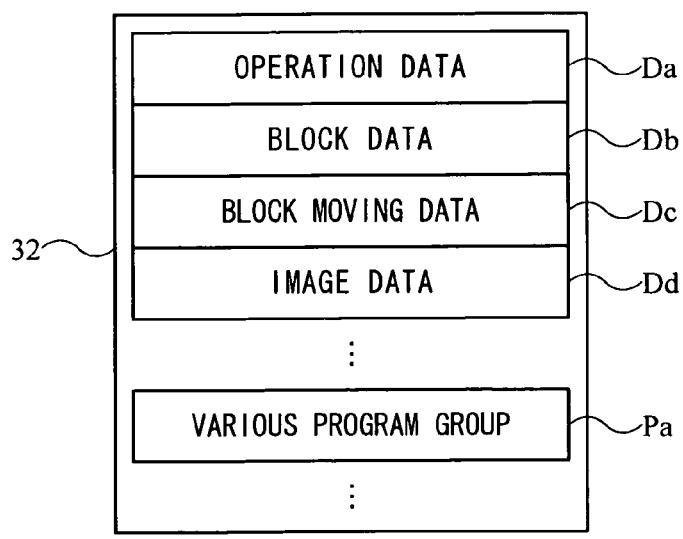
FIG. 9 is a diagram showing an example of various data stored in a main memory 32 by executing an image processing program according to an embodiment.
Figure 11:
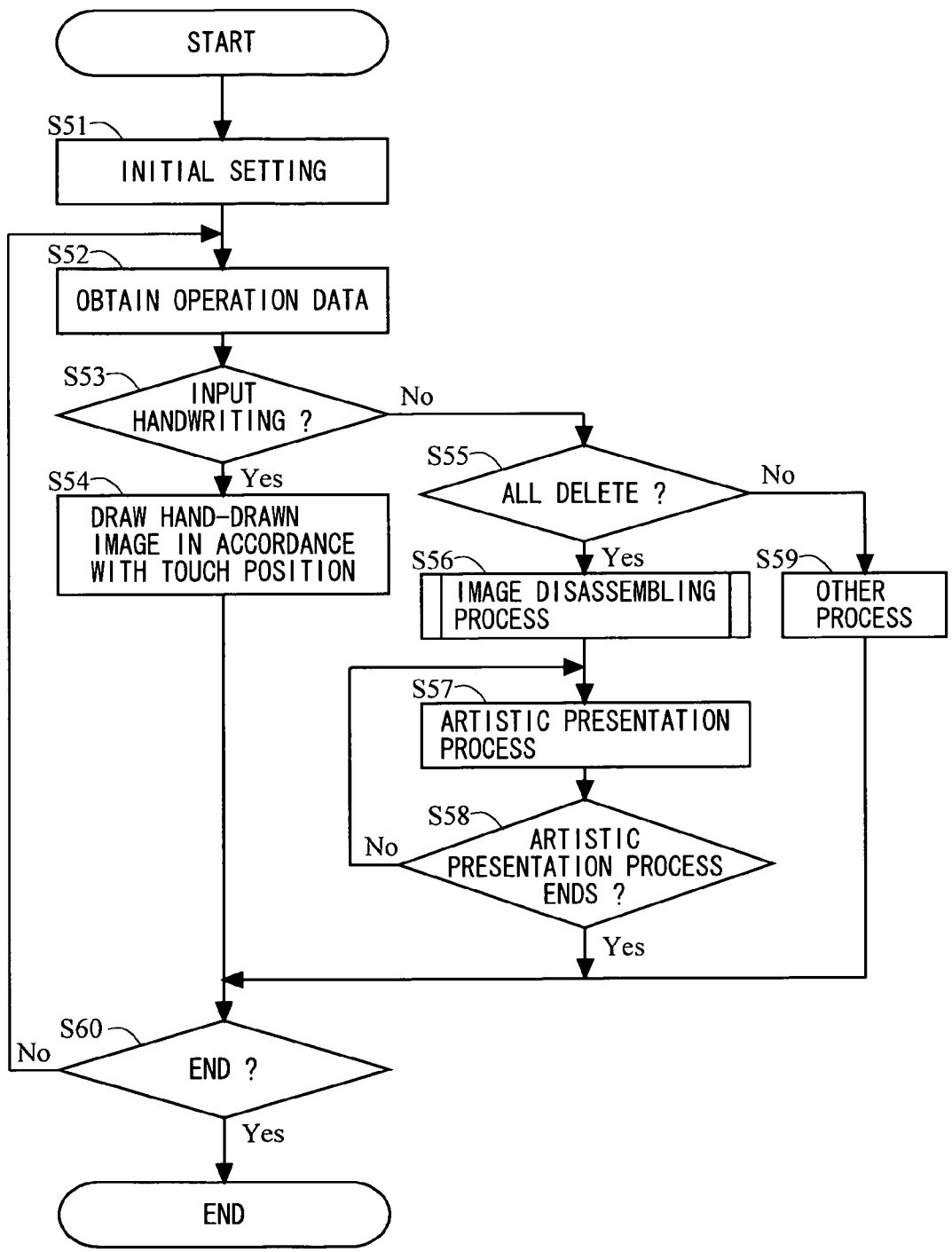
FIG. 11 is a flowchart showing an image process performed on the game apparatus 1 by executing the image processing program according to an embodiment.
Figure 12:
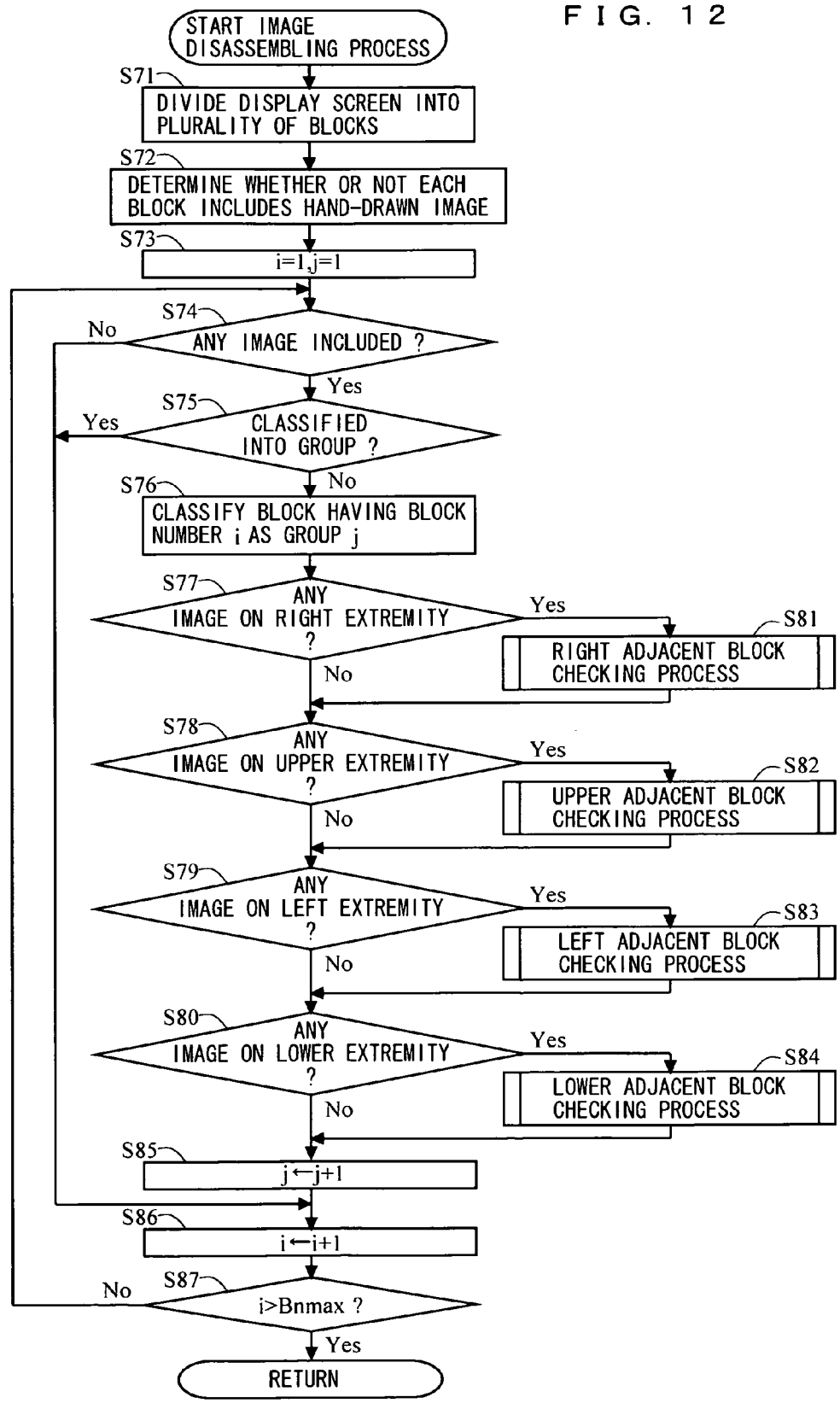
FIG. 12 is a subroutine showing, in detail, an operation of an image disassembling process performed in step 56 shown in FIG. 11.
Figure 13:
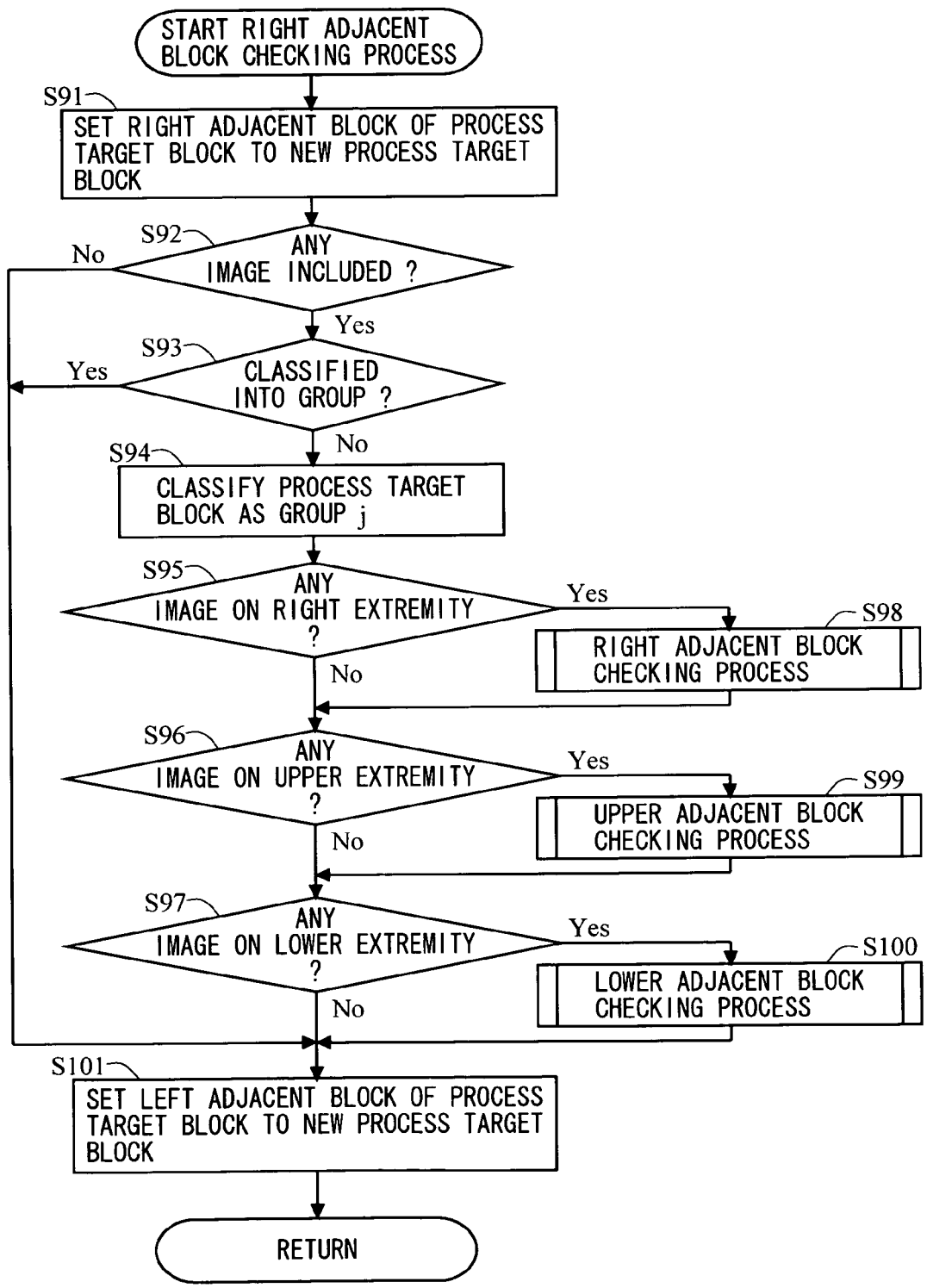
FIG. 13 is a subroutine showing, in detail, an operation of a right-adjacent block checking process performed in step 81 and the like shown in FIG. 12.
Figure 14:
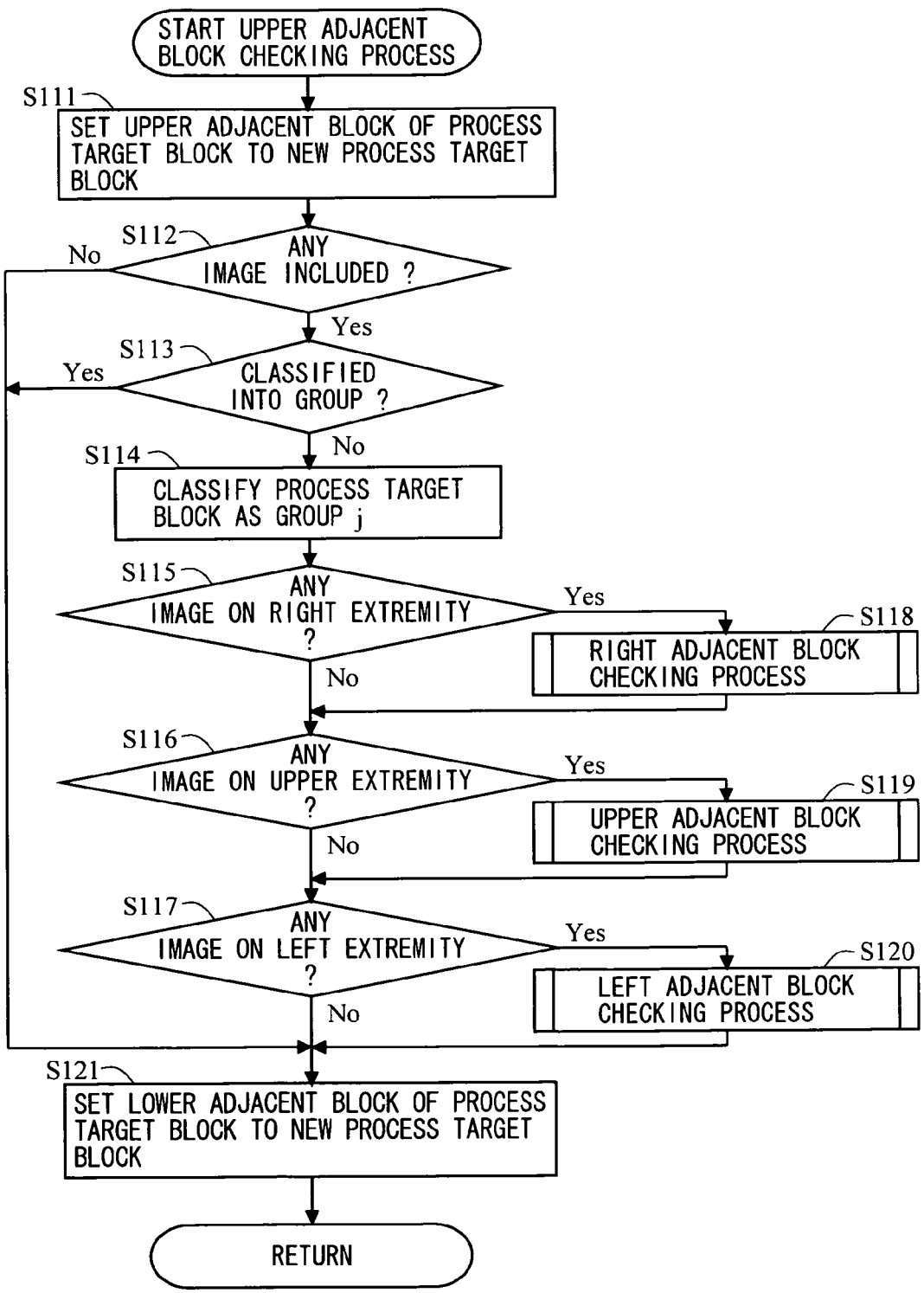
FIG. 14 is a subroutine showing, in detail, an operation of an upper adjacent block checking process performed in step 82 and the like shown in FIG. 12.
Figure 15:
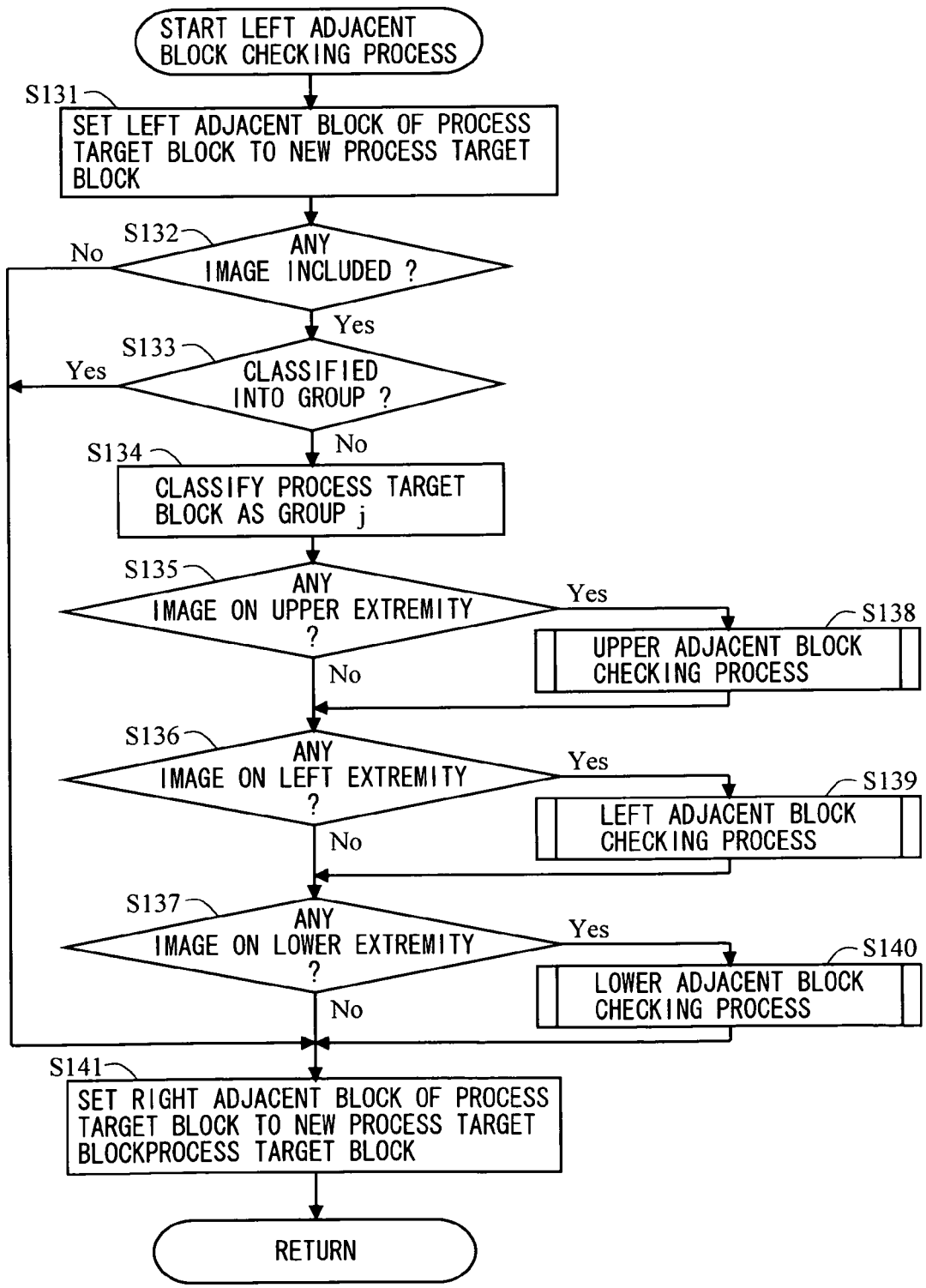
FIG. 15 is a subroutine showing, in detail, an operation of a left adjacent block checking process performed in step 83 and the like shown in FIG. 12.
Figure 16:
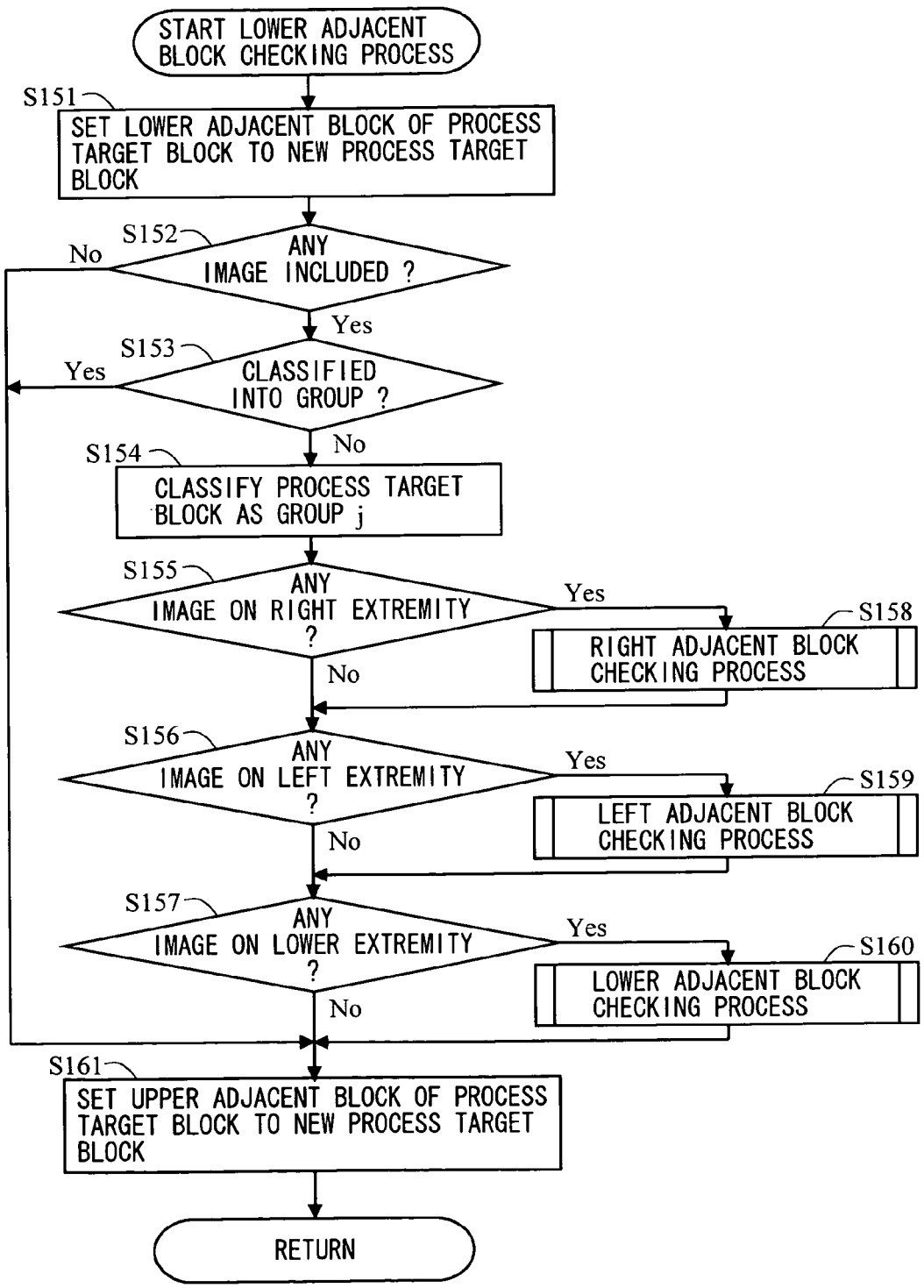

Next, with reference to FIG. 9 to FIG. 16, specific processing operations of the image processing program executed on the game apparatus 1 will be described. FIG. 9 is a diagram showing an example of various data stored in the main memory 32 when the image processing program is executed. FIG. 10 is a diagram showing an example of block data Db stored in the main memory 32. FIG. 11 is a flowchart showing image processing performed on the game apparatus 1 by executing the image processing program. FIG. 12 is a subroutine showing, in detail, an operation of an image disassembling process performed in step 56 shown in FIG. 11. FIG. 13 is a subroutine showing, in detail, an operation of a right adjacent block checking process performed in step 81 and the like shown in FIG. 12. FIG. 14 is a subroutine showing, in detail, an operation of an upper adjacent block checking process performed in step 82 and the like shown in FIG. 12. FIG. 15 is a subroutine showing, in detail, an operation of a left adjacent block checking process performed in step 83 and the like shown in FIG. 12. FIG. 16 is a subroutine showing, in detail, an operation of a lower adjacent block checking process performed in step 84 and the like shown in FIG. 12. The program executing the processes are included in a memory (such as the stored data memory 34) embedded in the game apparatus 1, the memory card 28, or the memory card 29. When the power of the game apparatus 1 is turned ON, the program is read to the main memory 32 from the memory card 28 or the memory card 29 via the memory card I/F 36, or from the embedded memory, and is executed by the CPU 31.

In FIG. 9, stored in the main memory 32 are the program read from the embedded memory, the memory card 28, or the memory card 29, and temporary data generated during the image processing. In FIG. 9, the data storage area of the main memory 32 stores therein operation data Da, block data Db, block moving data Dc, and image data Dd and the like. The program storage area of the main memory 32 stores therein various program group Pa composing the image processing program.

The operation data Da stores therein data of the user operating the game apparatus 1. The operation data Da includes data of a touch coordinate point indicative of a touch position touched by the user on a screen coordinate system of the touch panel 13. For example, the touch coordinate point is obtained every time unit (e.g., 1/60 seconds), during which the game apparatus 1 performs a game process, and is stored in the operation data Da upon such obtainment.

The block data Db stores therein data of respective blocks which are obtained by dividing a display screen for displaying the hand-drawn image into a plurality of areas. As shown in FIG. 10, data indicative of a block number Bn, a with-or-without image flag, a group number Gn, and a connection flag are stored in the block data Db with respect to each of the blocks. The block number Bn is a number provided to each of the blocks. The with-or-without image flag is a data indicative of whether or not at least a part of a hand-drawn image is included in each of the blocks. The group number Gn is a number given to each of the groups obtained by dividing the hand-drawn image. The connection flag is data indicative of whether or not a block, which is a target to be processed, and its adjacent block are connected to each other by the hand-drawn image when the process target block is regarded as a reference block. For example, the connection flag includes a flag indicative of whether or not the process target block is connected to its right adjacent block, a flag indicative of whether or not the block is connected to its upper adjacent block, a flag indicative of whether or not the block is connected to its left adjacent block, and a flag indicative of whether or not the block is connected to its lower adjacent block.

With reference back to FIG. 9, the block moving data Dc is set with respect to each of the blocks, and stores therein data (e.g. a moving direction and a moving speed) for causing the block to move in a virtual world. The image data Dd stores therein image data for displaying, for example, the hand-drawn image and the operation button images on the game apparatus 1.

Next, with reference to FIG. 11, an operation of the game apparatus 1 will be described. First, when the power (power button 14F) of the game apparatus 1 is turned ON, a boot program (not shown) is executed by the CPU 31, whereby the image processing program, which is stored in the embedded memory, the memory card 28, or the memory card 29, is loaded to the main memory 32. The loaded image processing program is executed by the CPU 31, whereby steps (abbreviated as "S" in FIG. 11 to FIG. 16) shown in FIG. 11 are executed.

In FIG. 9, the CPU 31 performs initialization of image processing (step 51), and advances the processing to the subsequent step. For example, as the initialization performed in step 51, the CPU 31 initialize respective parameters stored in the main memory 32 to predetermined numerical values. For example, all the with-or-without image flags and the connection flags stored in the block data Db are set OFF, and all the group numbers Gn are set to "0".

Next, the CPU 31 obtains the operation data, which is outputted through the user's operation of the operation buttons 14 or the touch panel 13, updates the operation data Da (step 52), and advances the processing to the subsequent step. For example, the CPU 31 obtains a touch coordinate point indicative of a touch position touched by the user on the screen coordinate system of the touch panel 13, and updates the touch coordinate point stored in the operation data Da.

Next, the CPU 31 determines whether the operation data obtained in step 52 is data indicative of a handwriting input by the user (step 53) or data indicative of all-delete operation (step 55). For example, when the operation data indicates a touch operation which is performed after the hand-drawn line draw button Bhw or the hand-drawn stamp draw button Bst (see FIG. 3 and the like) is selected, the CPU 31 determines that the data indicates the handwriting input (Yes in step 53), and advances the processing to subsequent step 54. Further, when the operation data indicates selection of the all-delete button Bae, the CPU 31 determines that the data indicates all-delete operation (Yes in step 55), and advances the processing to subsequent step 56. On the other hand, when the operation data indicates neither data indicative of the handwriting input nor data indicative of all-delete operation (No in step 53 and step 55), then the CPU 31 advances the processing to subsequent step 59.

In step 54, the CPU 31 generates a hand-drawn image to be drawn on the lower LCD 12 in accordance with the operation data (touch coordinate point data) obtained in step 52, and advances the processing to subsequent step 60.

For example, the CPU core 31 calculates a position in a virtual world corresponding to the touch coordinate point obtained in step 52. The position can be obtained by transparently transforming the touch coordinate point onto the virtual world. For example, the position can be obtained by calculating a position on a two-dimensional plane in the virtual world displayed on the lower LCD 12, the position corresponding to the touch coordinate point. When the hand-drawn line draw button Bhw is selected and the above-described position is calculated in the previous round of processing, then the CPU 31 generates a line segment of a predetermined thickness, the line segment connecting between the position calculated in the previous round of processing and that calculated in the current round of processing, and displays the line segment on the lower LCD 12. Further, when the hand-drawn stamps draw button Bst is selected and the position is calculated in the previous round of processing, and further in the case where a distance, in the virtual world, from the position of a stamp most recently displayed on the lower LCD 12 to the position calculated in the current round of processing reaches a threshold, then the CPU 31 newly displays a stamp (e.g., a stamp composed of a pair of two leaf-shaped figures) on the position calculated in the current round of processing. When the hand-drawn stamps draw button Bst is selected, and the position is calculated in the previous round of processing, and further in the case where time equal to or more than a threshold amount of time has elapsed since the last stamp was displayed on the lower LCD 12, then the CPU 31 may newly display a stamp at the position calculated in the current round of processing. Further, when the hand-drawn stamps draw button Bst is selected, and the position is calculated in the previous round of processing, and further in the case where a total amount of displacement, in the virtual world, from the position of the stamp most recently displayed on the lower LCD 12 to the position calculated in the current round of processing (i.e., a total amount of displacement of the touch coordinate point) reaches a threshold value, then the CPU 31 may newly display a stamp at the position calculated in the current round of processing. Further, when a new handwriting input is made on free lines or stamps already displayed, then the CPU 31 newly displays a free line or a stamp generated in accordance with the new handwriting input by overlapping the free line or the stamp on the free lines or stamps already displayed.

On the other hand, when the all-delete operation is performed (Yes in step 55), the CPU 31 performs the image disassembling process (step 56), and advances the processing to the subsequent step. With reference to FIG. 12, an operation of the image disassembling process will be described in detail.

In FIG. 12, the CPU 31 divides the display screen DA, which is displayed on the lower LCD 12, into a plurality of blocks (step 71), determines whether or not each of the blocks includes an hand-drawn image (step 72), and then advances the processing to subsequent step 73.

For example, as shown in FIG. 17, the display screen DA is divided into lattice-shaped blocks composed of m rows×n columns. Preferably, each of the block has a common size, and the size of each blocks is, for example, set to 8 pixels in a horizontal direction×8 pixels in a vertical direction. The CPU 31 provides the block number Bn to each of the blocks. The numerical values in the blocks shown in FIG. 17 indicate exemplary block numbers Bn provided to the blocks, and the block numbers Bn are provided in order of 1, 2, 3 . . . to the blocks starting with the block at the top left toward those in the right side direction. Accordingly, the block number Bn provided to the last block at the bottom right is m×n (Bnmax, a maximum value).

The CPU 31 determines whether or not at least a part of the hand-drawn image is drawn on each of the blocks, and sets the with-or-without image flag (see FIG. 10) ON with respect to such a block that is determined to have the hand-drawn image drawn thereon. For example, when at least one pixel of one of the block, the block including 8 pixels in the horizontal direction×8 pixels in the vertical direction, has the hand-drawn image or the stamp drawn thereon, the CPU 31 determines that at least a part of the input image is drawn on the block, and sets the with-or-without flag ON with respect to the block.

In step 73, the CPU 31 sets a block number i, which is a current process target, to 1, and sets a group number j, which is a current process target, to 1, and then advances the processing to the subsequent step.

Next, the CPU 31 determines whether or not a hand-drawn image is drawn on a block having the current process target block number i (step 74). For example, the CPU 31 refers to the with-or-without image flag, which is included in the block data Db and is related to the current process target block number i, and determines that the hand-drawn image is drawn on the block when the with-or-without image flag is ON. When the hand-drawn image is drawn on the block having the current process target block number i, the CPU 31 advances the processing to subsequent step 75. On the other hand, when the hand-drawn image is not drawn on the block having the current process target block number i, the CPU 31 advances the processing to subsequent step 86.

In step 75, the CPU 31 determines whether or not the block having the current process target block number i is classified as belonging to any group. For example, the CPU 31 refers to the group number Gn, which is included in the block data Db and is related to the current process target block number i, and determines that the block is classified as belonging to some group when the group number is any numerical value other than 0. When the block having the current process target block number i is not classified as belonging to any group, the CPU 31 advances the processing to subsequent step 76. On the other hand, when the block having the current process target block number i is classified as belonging to some group, the CPU 31 then advance the processing to subsequent step 86.

In step 76, the CPU 31 sets the block having the current process target block number i as a block belonging to the current process target group number j, and advances the processing to the subsequent step. For example, the CPU 31 writes the current process target group number j to the group number which is included in block data Db and is related to the current process target block number i, and updates the block data Db.

Next, the CPU 31 determines, one by one, whether or not the block having the current process target block number i has the hand-drawn image included in pixels in its right extremity column (step 77), whether or not the hand-drawn image is included in pixels in its upper extremity row (step 78), whether or not the hand-drawn image is included in pixels in its left extremity column (step 79), and whether or not the hand-drawn image is included in pixels in its lower extremity row (step 80).

Figure 18:
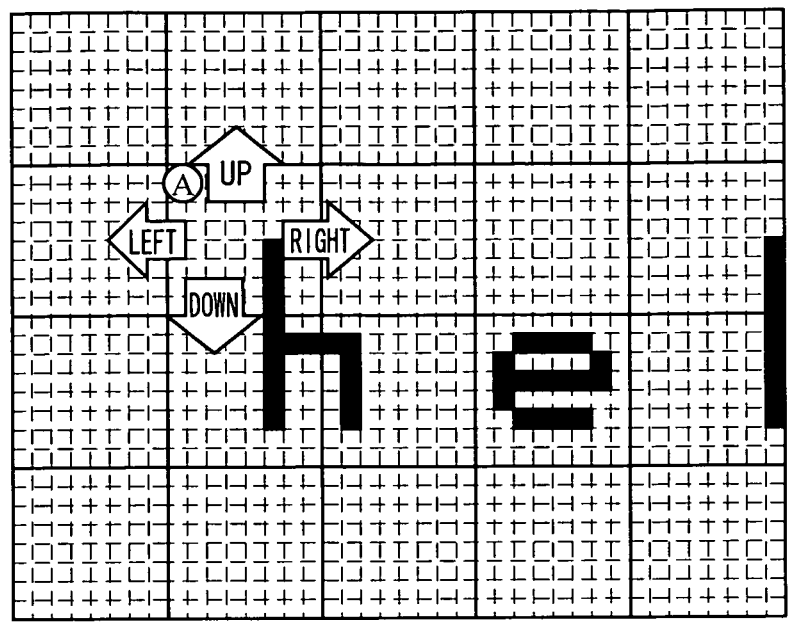
FIG. 18 is a diagram illustrating a right block, an upper block, a left block and a lower block, which are respectively adjacent to a block A.

For example, as shown in FIG. 18, suppose that a block A is a current process target block. In this case, the block A is adjacent to a block on the right side, a block on the upper side, a block on the left side, and a block on the lower side, respectively. The CPU 31 determines whether or not the block A is connected, by the hand-drawn image, to the adjacent blocks. For example, a part of "h", one of the hand-drawn characters is drawn on the block A and the lower adjacent block to the block A, and thus it is determined that the block A and the lower adjacent block are connected to each other by the hand-drawn character "h". On the other hand, any common hand-drawn character is not found between the block A and its left adjacent block, upper adjacent block, and right adjacent block, and thus it is determined that the block A and each of the adjacent blocks are not connected.

Figure 19:
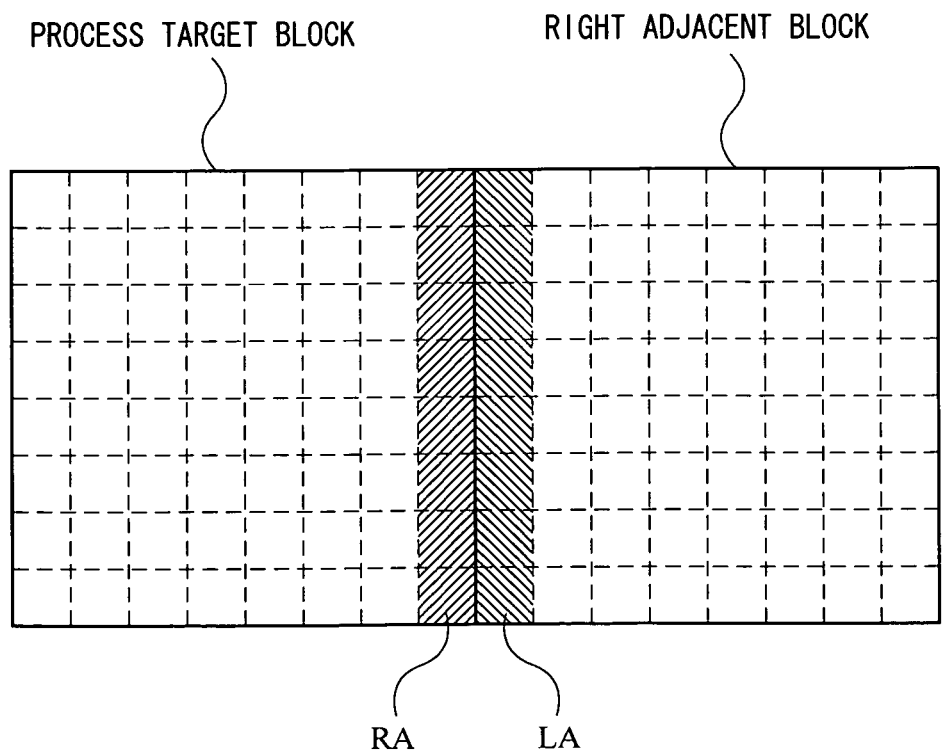
FIG. 19 is a diagram showing examples of pixels in extremities, the pixels being used for determining a connection relation between a process target block and its right adjacent block.

In order to determine a connection relation between blocks, in the present embodiment, used as a determination criterion is whether or not a hand-drawn image is found on pixels in extremities of the block having the current process target block number i. For example, as shown in FIG. 19, when the connection relation between the process target block and its right adjacent block are considered, whether or not hand-drawn image is included in pixels in the right extremity column RA (e.g., 8 pixels in the right extremity column, in the case where the block has a size of 8 pixels in the horizontal direction×8 pixels in the vertical direction), i.e., a right-most column of the process target block, is determined. When the hand-drawn image is included in at least a part of the right extremity column RA, it is determined that the process target block and the right adjacent block are connected to each other (determination criterion A).

In order to determine the connection relation between the blocks, other pixels may be used. For example, when the connection relation with the right adjacent block is considered, the connection relation between the blocks may be determined by using not only the pixels in the right extremity column RA but also pixels in a left extremity column LA, which is located at a left-most position of the right adjacent block, as shown in FIG. 19. Specifically, consider the connection relation between the process target block and the right adjacent block. When pixels in the right extremity column RA of the process target block and pixels in the left extremity column LA of the right adjacent block include the hand-drawn image, then it is determined that the process target block and the right adjacent block are connected to each other (determination criterion B). Further, it may be determined that the process target block and the right adjacent block are connected to each other only when the pixels including the hand-drawn image in the right extremity column RA of the process target block and the pixels including the hand-drawn image in the left extremity column LA of the right adjacent block are adjacent to each other (determination criterion C). In this case, even if any of the pixels in the right extremity column RA of the process target block and any of the pixels in the left extremity column LA of the right adjacent block include the hand-drawn image, respectively, it is determined that the process target block and the right adjacent block are not connected to each other unless such pixels including the hand-drawn image in the process target block and those in the right adjacent block are adjacent to each other.

Results of determination on the connection relation between the blocks according to the above-described determination criteria A to C are shown in FIG. 20. For example, as shown in FIG. 20, attention is focused on the right extremity column RA of the process target block and the left extremity column LA of the right adjacent block, and Examples 1 to 3 will be considered. As in the case of Example 1 shown in FIG. 20, when the hand-drawn image (indicated by filled pixels in FIG. 20) is included in the right extremity column RA of the process target block, it is determined that the blocks are connected according to the determination criterion A, whereas it is determined that the blocks are not connected according to the determination criteria B and C. As in the case of Example 2 shown in FIG. 20, when the hand-drawn images are included in the right extremity column RA of the process target block and in the left extremity column LA of the right adjacent block, respectively, but when the pixels of both blocks including the hand-drawn images are not adjacent to each other, then it is determined that the blocks are connected to each other according to the determination criteria A and B, whereas it is determined that the blocks are not connected to each other according to the determination criterion C. Further, as in the case of Example 3 shown in FIG. 20, when the hand-drawn image is included in the right extremity column RA of the process target block and in the left extremity column LA of the right adjacent block, and when the pixels of both blocks including the hand-drawn images are adjacent to each other, then it is determined that the blocks are connected to each other according to all the determination criteria A to C. In this manner, the determination results are changed depending on the setting of the determination criteria, and thus the determination criteria may be selected appropriately in accordance with a processing load and disassembling accuracy which is described later. In the present embodiment, an example will be described in which the connection relation between blocks is determined according to the determination criterion A.

With reference back to FIG. 12, the CPU 31 determines whether or not the hand-drawn image is included in the pixels in the right extremity column of the block having the current process target block number i (step 77). When the hand-drawn image is included in the pixels in the right extremity column of the block having the current process target block number i, that is, when the CPU 31 determines that the process target block and the right adjacent block are connected to each other (Yes in step 77), the CPU 31 sets the connection flag (right) ON with respect to the block having the block number i (see FIG. 10), performs a right adjacent block checking process (step 81), and advances the processing to subsequent step 78. On the other hand, when the hand-drawn image is not included in the pixels in the right extremity column of the block having the current process target block number i, that is, when the CPU 31 determines that the process target block and the right adjacent block are not connected to each other (No in step 77), the CPU 31 directly advances the processing to subsequent step 78. An operation of the right adjacent block checking process will be described later in detail.

In step 78, the CPU 31 determines whether or not the hand-drawn image is included in pixels in an upper extremity row of the block having the current process target block number i. When the hand-drawn image is included in the pixels in the upper extremity row of the block having the current process target block number i, that is, when the CPU 31 determines that the process target block and the upper adjacent block are connected to each other (Yes in step 78), the CPU 31 sets the connection flag (up) ON with respect to the block having the block number i, performs a upper adjacent block checking process (step 82), and advances the processing to subsequent step 79. On the other hand, when the hand-drawn image is not included in the pixels in the upper extremity row of the block having the current process target block number i, that is, when the CPU 31 determines that the process target block and the upper adjacent block are not connected to each other (No in step 78), the CPU 31 directly advances the processing to subsequent step 79. An operation of the upper adjacent block checking process will be described later in detail.

In step 79, the CPU 31 determines whether or not the hand-drawn image is included in pixels in the left extremity column of the block having the current process target block number i. When the hand-drawn image is included in the pixels in the left extremity column of the block having the current process target block number i, that is, when the CPU 31 determines that the process target block and the left adjacent block is connected to each other (Yes in step 79), then the CPU 31 sets the connection flag (right) ON with respect to the block having the block number i, performs a left adjacent block checking process (step 83), and advances the processing to subsequent step 80. On the other hand, when the hand-drawn image is not included in the pixels in the left extremity column of the block having the current process target block number i, that is, when the CPU 31 determines that the process target block and the left adjacent block are not connected to each other (No in step 79), the CPU 31 directly advances the processing to subsequent step 80. An operation of the left adjacent block checking process will be described later in detail.

In step 80, the CPU 31 determines whether or not the hand-drawn image is included in pixels in the lower extremity row of the block having the current process target block number i. When the hand-drawn image is included in the pixels in the lower extremity row of the block having the current process target block number i, that is, when the CPU 31 determines that the process target block and the lower adjacent block are connected to each other (Yes in step 80), the CPU 31 sets the connection flag (down) ON with respect to the block having the block number i, performs a lower adjacent block checking process (step 84), and then advances the processing to subsequent step 85. On the other hand, when the hand-drawn image is not included in the pixels in the lower extremity row of the block having the current process target block number i, that is, when the CPU 31 determines that the process target block and the lower adjacent block are not connected to each other (No in step 80), the CPU 31 directly advances the processing to subsequent step 85. An operation of the lower adjacent block checking process will be described later in detail.

In step 85, the CPU 31 adds 1 to the current process target group number j so as to update the group number j to a new process target group, and advances the processing to subsequent step 86.

In step 86, the CPU 31 adds 1 to the current process target block number i so as to update the block number i to a new process target block, and advances the processing to the subsequent step.

Next, the CPU 31 determines whether or not the current process target block number i is greater than Bnmax, the maximum value of the block number (step 87). The maximum value Bnmax is provided to each of the blocks when the display screen DA is divided into the blocks in step 71. When the current process target block number i is equal to or lower than the maximum value Bnmax of the block number, the CPU 31 return to step 74, and repeats the processing. On the other hand, the current process target block number i is greater than the maximum value Bnmax of the block number, the CPU 31 terminates the processing in the current subroutine, and advances the processing to step 57 (FIG. 11).

Hereinafter, with reference to FIG. 13, the right adjacent block checking process performed in above-described step 81, or step 98, step 118, and step 158, which are to be described later, will be explained.

In FIG. 13, the CPU 31 sets the right adjacent block, which is right-adjacent to the block currently processed (process target block), as a new process target block (step 91), and advances the processing to the subsequent step. For example, when a block having the block number m+2 shown in FIG. 17 is the process target block, a block having the block number m+3, which is right-adjacent to the block, is set as a new process target block.

Next, the CPU 31 determines whether or not the hand-drawn image is drawn in the process target block (step 92). For example, the CPU 31 refers to the with-or-without image flag which is included in the block data Db and is related to the current process target block, and determines that the hand-drawn image is drawn, when the with-or-without image flag is ON. When the hand-drawn image is drawn in the process target block, the CPU 31 advances the processing to subsequent step 93. On the other hand, when the hand-drawn image is not drawn in the process target block, the CPU 31 advances the processing to subsequent step 101.

In step 93, the CPU 31 determines whether or not the process target block is classified as belonging to any group. For example, the CPU 31 refers to the group number Gn which is included in the block data Db and is related to the process target block, and determines that the process target block is already classified as belonging to some group when the group number is any numerical value other than 0. When the process target block is not classified as belonging to any group, the CPU 31 advances the processing to subsequent step 94. On the other hand, when the process target block is already classified as belonging to some group, the CPU 31 advances the processing to subsequent step 101.

In step 94, the CPU 31 sets the process target block as a block belonging to the group having the current process target group number j, and advances the processing to the subsequent step. For example, the CPU 31 writes the group number j to the group number which is included in the block data Db and is related to the process target block, and updates the block data Db. In other words, according to the process in above-described step 94, the process target block and the block, which is set as the process target prior to the right-adjacent block checking process (i.e., the block left-adjacent to the process target block), belong to a group having a common group number.

Next, the CPU 31 determines whether or not the hand-drawn image is included in pixels in the right extremity column of the process target block (step 95). When the hand-drawn image is included in the pixels in the right extremity column of the process target block, that is, when the CPU 31 determines that the process target block and the right adjacent block are connected to each other (Yes in step 95), the CPU 31 sets the connection flag (right) ON with respect to the process target block, starts (step 98) the right adjacent block checking process again from step 91, and advances the processing to step 96 after the right adjacent block checking processing ends. On the other hand, when the hand-drawn image is not included in the pixels in the right extremity column of the process target block, that is, when the CPU 31 determines that the process target block and the right adjacent block are not connected to each other (No in step 95), then the CPU 31 directly advances the processing to subsequent step 96.

In step 96, the CPU 31 determines whether or not the hand-drawn image is included in pixels in the upper extremity row of the process target block. When the hand-drawn image is included in the pixels in the upper extremity row of the process target block, that is, when the CPU 31 determines that the process target block and the upper adjacent block are connected to each other (Yes in step 96), the CPU 31 sets the connection flag (up) ON with respect to the process target block, performs an upper adjacent block checking process (step 99), and advances the processing to subsequent step 97. On the other hand, when the hand-drawn image is not included in the pixels in the upper extremity row of the process target block, that is, when then CPU 31 determines that the process target block and the upper adjacent block are not connected to each other (No in step 96), the CPU 31 directly advances the processing to subsequent step 97.

In step 97, the CPU 31 determines whether or not the hand-drawn image is included in pixels in the lower extremity row of the process target block. When the hand-drawn image is included in the pixels in the lower extremity row of the process target block, that is, when the CPU 31 determines that the process target block and the lower adjacent block are connected to each other (Yes in step 97), the CPU 31 sets the connection flag (down) ON with respect to the process target block, performs a lower adjacent block checking process (step 100), and advances the processing to subsequent step 101. On the other hand, when the hand-drawn image is not included in the pixels in the lower extremity row of the process target block, that is, when the CPU 31 determines that the process target block and the lower adjacent block are not connected to each other (No in step 97), the CPU 31 directly advances the processing to subsequent step 101.

In step 101, the CPU 31 sets a block left-adjacent to the process target block as a new process target block, and terminates the processing in the current subroutine. For example, when the block having the block number m+3 shown in FIG. 17 is the process target block, a block having the block number m+2, which is left-adjacent to the block is set as the new process target block.

Hereinafter, with reference to FIG. 14, the upper adjacent block checking process performed in above-described step 82, or step 99, step 119, and step 138, which are to be described later, will be explained.

In FIG. 14, the CPU 31 sets a block upper-adjacent to the current process target block as a new process target block (step 111), and advances the processing to the subsequent step. For example, when the block having the block number m+2 shown in FIG. 17 is the process target block, a block having the block number 2, which is upper-adjacent to the process target block, is set as the new process target block.

Next, the CPU 31 determines whether or not the hand-drawn image is drawn in the process target block (step 112). Since an exemplary operation in step 112 is the same as that in step 92, detail description thereof will be omitted. When the hand-drawn image is drawn in the process target block, the CPU 31 advances the processing to subsequent step 113. On the other hand, when the hand-drawn image is not drawn in the process target block, the CPU 31 advances the processing to subsequent step 121.

In step 113, the CPU 31 determines whether or not the process target block is classified as belonging to any group. Since an exemplary operation in step 113 is the same as that in step 93, detail description thereof will be omitted. When the process target block is not classified as belonging to any group, the CPU 31 advances the processing to subsequent step 114. On the other hand, when the process target block is classified as belonging to some group, the CPU 31 advances the processing to subsequent step 121.

In step 114, the CPU 31 sets the process target block as a block belonging to the group having the current process target group number j, and advances the processing to the subsequent step. Since an exemplary operation in step 114 is the same as that in step 94, detail description thereof will be omitted. According to the processing in step 114, the process target block and the block which is set as the process target prior to the upper adjacent block checking process (i.e., the block lower-adjacent to the process target block) belong to the group having a common group number.

Next, the CPU 31 determines whether or not the hand-drawn image is included in pixels in the right extremity column of the process target block (step 115). When, the hand-drawn image is included in the pixels in the right extremity column of the process target block, that is, when the CPU 31 determines that the process target block and the right adjacent block are connected to each other, (Yes in step 115), the CPU 31 sets the connection flag (right) ON with respect to the process target block, performs the above-described right adjacent block checking process (step 118), and advances the processing to subsequent step 116. On the other hand, when the hand-drawn image is not included in the pixels in the right extremity column of the process target block, that is, when the CPU 31 determines that the process target block and the right adjacent block are not connected to each other (No in step 115), the CPU 31 directly advances the processing to subsequent step 116.

In step 116, the CPU 31 determines whether or not the hand-drawn image is included in pixels in the upper extremity row of the process target block. When the hand-drawn image is included in the pixels in the upper extremity row of the process target block, that is, when the CPU 31 determines that the process target block and the upper adjacent block are connected to each other (Yes in step 116), the CPU 31 sets the connection flag (up) ON with respect to the process target block, starts (step 119) the upper adjacent block checking process again from step 111, and advances the processing to step 117 after the upper adjacent block checking process ends. On the other hand, when the hand-drawn image is not included in the pixels in the upper extremity row of the process target block, that is, when the CPU 31 determines that the process target block and the upper adjacent block are not connected to each other (No in step 116), the CPU 31 directly advances the processing to subsequent step 117.

In step 117, the CPU 31 determines whether or not the hand-drawn image is included in pixels in the lower extremity row of the process target block. When the hand-drawn image is included in the pixels in the lower extremity row of the process target block, that is, when the CPU 31 determines that the process target block and the lower adjacent block are connected to each other (Yes in step 117), the CPU 31 sets the connection flag (down) ON with respect to the process target block, performs a lower adjacent block checking process (step 120), and advances the processing to subsequent step 121. On the other hand, when the hand-drawn image is not included in the pixels in the lower extremity row of the process target block, that is, when the CPU 31 determines that the process target block and the lower adjacent block are not connected to each other (No in step 117), the CPU 31 directly advances the processing to subsequent step 121.

In step 121, the CPU 31 sets a block lower-adjacent to the process target block as a new process target block, and terminates the processing in the current subroutine. For example, when the block having the block number 2 shown in FIG. 17 is the process target block, the block having the block number m+2 which is lower-adjacent to the process target block is set as the new process target block.

Hereinafter, with reference to FIG. 15, a left adjacent block checking process, which is performed in above-described step 83 and step 120, or step 139 and step 159, which are to be described later, will be explained.

In FIG. 15, the CPU 31 sets a block left-adjacent to the current process target block as a new process target block (step 131), and advances the processing to the subsequent step. For example, when the block having the block number m+2 shown in FIG. 17 is the process target block, the block having the block number m+1, which is left-adjacent to the process target block, is set as the new process target block.

Next, the CPU 31 determines whether or not the hand-drawn image is drawn in the process target block (step 132). Since an exemplary operation in step 132 is the same as that in step 92, detail description thereof will be omitted. When the hand-drawn image is drawn in the process target block, the CPU 31 advances the processing to subsequent step 133. On the other hand, when the hand-drawn image is not drawn in the process target block, the CPU 31 advances the processing to subsequent step 141.

In step 133, the CPU 31 determines whether or not the process target block is not classified as belonging to any group. Since an exemplary operation in step 133 is the same as that in the step 93, detail description will be omitted. When the process target block is not classified as belonging to any group, the CPU 31 advances the processing to subsequent step 134. On the other hand, when the process target block is classified as belonging to some group, the CPU 31 advances the processing to subsequent step 141.

In step 134, the CPU 31 sets the process target block as a block belonging to the group having the current process target group number j, and advances the processing to the subsequent step. Since an exemplary operation in step 134 is the same as that in step 94, detail description will be omitted. According to above-described step 134, the process target block and the block, which is set as the process target prior to the left adjacent block checking process (a block right-adjacent to the process target block), belong to the group having a common group number.

Next, the CPU 31 determines whether or not the hand-drawn image is included in pixels in the upper extremity row of the process target block (step 135). When the hand-drawn image is included in the pixels in the upper extremity row of the process target block, that is, when the CPU 31 determines that the process target block and the upper adjacent block are connected to each other (Yes in step 135), the CPU 31 sets the connection flag (up) ON with respect to the process target block, performs the above-described upper adjacent block checking process (step 138), and advances the processing to subsequent step 136. On the other hand, when the hand-drawn image is not included in the pixels in the upper extremity row of the process target block, that is, when the CPU 31 determines that the process target block and the upper adjacent block are not connected to each other (No in step 135), the CPU 31 directly advances the processing to subsequent step 136.

In step 136, the CPU 31 determines whether or not the hand-drawn image is included in pixels in the left extremity column of the process target block. When the hand-drawn image is included in the pixels in the left extremity column of the process target block, that is, when the CPU 31 determines that the process target block and the left adjacent block are connected to each other (Yes in step 136), the CPU 31 sets the connection flag (left) ON with respect to the process target block, starts (step 139) the left adjacent block checking process again from step 131, and advances the processing to step 137 after the left adjacent block checking process ends. On the other hand, when the hand-drawn image is not included in the pixels in the left extremity column of the process target block, that is, when the CPU 31 determines that the process target block and the left adjacent block are not connected to each other (No in step 136), the CPU 31 directly advances the processing to subsequent step 137.

In step 137, the CPU 31 determines whether or not the hand-drawn image is included in pixels in the lower extremity row of the process target block. When the hand-drawn image is included in the pixels in the lower extremity row of the process target block, that is, when the CPU 31 determines that the process target block and the lower adjacent block are connected to each other (Yes in step 137), the CPU 31 sets the connection flag (down) ON with respect to the process target block, performs the lower adjacent block checking process (step 140), and advances the processing to subsequent step 141. On the other hand, when the hand-drawn image is not included in the pixels in the lower extremity row of the process target block, that is, when the CPU 31 determines that the process target block and the lower adjacent block are not connected to each other (No in step 137), the CPU 31 directly advances the processing to subsequent step 141.

In step 141, the CPU 31 sets a block right-adjacent to the process target block as a new process target block, and terminates the processing in the current subroutine. For example, when the block having the block number m+1 shown in FIG. 17 is the process target block, a block having the block number m+2, which is right-adjacent to the process target block, is set as the new process target block.

Hereinafter, with reference to FIG. 16, a lower adjacent block checking process which is performed in above-described step 84, step 100 and step 140, or step 160 which is to be described later will be explained.

In FIG. 16, the CPU 31 sets a block lower-adjacent to the current process target as a new process target block (step 151), and advances the processing to the subsequent step. For example, when the block having block umber m+2 shown in FIG. 17 is set as the process target block, a block having the block number 2m+2, which is lower-adjacent to the process target block, is set as the new process target block.

Next, the CPU 31 determines that whether or not the hand-drawn image is drawn in the process target block (step 152). Since an exemplary operation in step 152 is the same as that in step 92, detail description thereof will be omitted. When the hand-drawn image is drawn in the process target block, the CPU 31 advances the processing to subsequent step 153. On the other hand, when the hand-drawn image is not drawn in the process target block, the CPU 31 advances the processing to subsequent step 161.

In step 153, the CPU 31 determines whether or not the process target block is classified as belonging to any group. Since an exemplary operation in step 153 is the same as that in step 93, detail description thereof will be omitted. When the process target block is not classified as belonging to any group, the CPU 31 advances the processing to subsequent step 154. On the other hand, when the process target block is classified as belonging to some group, the CPU 31 advances the processing to subsequent step 161.

In step 154, the CPU 31 sets the process target block as a block belonging to the group having current process target group number j, and advances the processing to the subsequent step. Since an exemplary operation in step 154 is the same as that in step 94, detail description thereof will be omitted. According to above-described processing step 154, the process target block and the block, which is set as the process target prior to the lower adjacent block checking processing (i.e., the block upper-adjacent to the process target block), belong to the group having a common group number.

Next, the CPU 31 determines whether or not the hand-drawn image is included in pixels in the right extremity column of the process target block (step 155). When the hand-drawn image is included in the pixels in the right extremity column of the process target block, that is, when the CPU 31 determines that the process target block and the right adjacent block is connected to each other (Yes in step 155), the CPU 13 sets the connection flag (right) ON with respect to the process target block, performs the above-described right adjacent block checking process (step 158), and advances the processing to subsequent step 156. On the other hand, when the hand-drawn image is not included in the pixels in the right extremity column of the process target block, that is, when the CPU 31 determines that the process target block and the right adjacent block are not connected to each other, (No in step 155), the CPU directly advances the processing to subsequent step 156.

In step 156, the CPU 31 determines whether or not the hand-drawn image is included in pixels in the left extremity column of the process target block. When the hand-drawn image is included in the pixels in the left extremity column of the process target block, that is, when the CPU 31 determines that the process target block and left adjacent block are connected to each other (Yes in step 156), the CPU 31 sets the connection flag (left) ON with respect to the process target block, performs the above-described left adjacent block checking process (step 159), and advances the processing to subsequent step 157. On the other hand, when the hand-drawn image is not included in the pixels in the left extremity column of the process target block, that is, when the CPU 31 determines that the process target block and the right-adjacent block are not connected to each other (No in step 156), the CPU 31 directly advances the processing to subsequent step 157.

In step 157, the CPU 31 determines whether or not the hand-drawn image is included in pixels in the lower extremity row of the process target block. When the hand-drawn image is included in the pixels in the lower extremity row of the process target block, that is, when the CPU 31 determines that the process target block and the lower adjacent block are connected to each other (Yes in step 157), the CPU 31 sets the connection flag (down) ON with respect to the process target block, starts (step 160) the lower adjacent block checking process again from above-described step 151, and advances the processing to step 161 after the lower adjacent block checking process ends. On the other hand, when the hand-drawn image is not included in the pixels in the lower extremity row of the process target block, that is, when the CPU 31 determines that the process target block and the lower adjacent block are not connected to each other (No in step 157), the CPU 31 directly advances the processing to subsequent step 161.

In step 161, the CPU 31 sets a block upper-adjacent to the process target block as a new process target block, and terminates the processing in the current subroutine. For example, when a block having the block number 2m+2 shown in FIG. 17 is the process target block, a block having the block number m+2, which is upper-adjacent to the process target block, is set as the new process target block.

With reference to FIG. 21, an example will be described where the hand-drawn image is disassembled through the above-described image disassembling process. In FIG. 21, A to C indicates the block numbers, and values described in arrows indicate the order based on which the connection relation between blocks are determined. Symbols described in the arrows indicate the respective determination results.

In FIG. 21, a case will be considered where a block having the block number A (hereinafter referred to as a block A) is a process target block, and processes in above-described step 74 to step 87 (see FIG. 12) are performed. The block A includes "h", a part of hand-drawn characters, and thus is classified as belonging to any one of groups (e.g., group having group number 1, hereinafter referred to as a group 1) (step 74 to step 76).

When attention is focused on blocks adjacent to the block A on the right side, left side and upper side, then these blocks and the block A do not include a common hand-drawn image, and thus the CPU 31 determines that the block A and the blocks on the right, left, and upper sides are not connected to each other, respectively (denoted by ×1 to ×3) (step 77 to step 79). On the other hand, when the attention is focused on the block (block B) adjacent to the block A on the lower side, the block B includes "h", the part of the hand-drawn characters which is also included in the block A. Therefore, the CPU 31 determines that the block A and the block B are connected to each other (denoted by ○4) (step 80). The block B is then set as the process target block, and the checking process (lower adjacent block checking process, step 84) is performed. According to the checking process, since the block B includes "h", the part of the hand-drawn characters, the block B is classified as belonging to the group 1 which also includes the block A (step 151 to step 154).

When attention is focused on the block (block C) adjacent to the block B on the right side, the block C also includes "h", the part of the hand-drawn characters, which is also included in the blocks A and B, and thus the CPU 31 determines that the block B and the block C are connected to each other (denoted by ○5) (step 155). The block C is then set as the process target block, and the checking process (the right adjacent block checking process, step 158) is performed. According to the checking process, since the block C includes "h", the part of the hand-drawn characters, the block C is classified as belonging to the group 1 which also includes the blocks A and B (step 91 to step 94).

Next, when attention is focused on blocks adjacent to the block C on the right side and on the upper side, respectively, these blocks and the block C do not include a common hand-drawn image. Therefore, the CPU 31 determines that the block C is connected to neither the right adjacent block nor the upper adjacent block (denoted by ×6 to ×8) (step 95 to step 97). The checking process (right adjacent block checking process, step 158) of the block C, which is the process target block, ends, and the CPU 31 returns to the checking process (step 156), where the block B is set as the process target block.

Next, when attention is focused on the blocks adjacent to the block B on the left side and on the lower side, respectively, such blocks and the block B do not include a common hand-drawn image. Therefore, the CPU 31 determines that the block B is not connected to neither the left adjacent block nor the lower adjacent block (denoted by ×9 and ×10) (step 156 and step 157). The checking process (the lower adjacent block checking process, step 84) of the block B, which is the process target block, ends, and the CPU 31 returns to the checking process (step 85), where the block A is set as the process target block.

In the above-described image disassembling process, a block connection determination process is performed with respect to respective sides of one of the blocks, and the block connection determination process is also performed recursively with respect to such blocks that are determined to be connected to the one of the blocks, whereby a range where a hand-drawn image is continuously included is determined. For example, as shown in FIG. 21, in accordance with the connection determination process, it is determined that range where the hand-drawn character "h" is continuously included is the block A to the block C, and accordingly, the block A to the block C is classified as belonging to a common group. The image disassembling process is repeated in a similar manner, and the hand-drawn characters are classified into different groups on the basis of a range where each of the hand-drawn characters is continuously included. This is not limited to the hand-drawn characters, but is applied to the hand-drawn stamps, free lines and the like, and the groups are classified on the basis of the range where each of the hand-drawn images is continuously included.

With reference back to FIG. 11, after the image disassembling process in step 56, the CPU 31 performs an artistic presentation process (step 57), and advances the processing to the subsequent step. Hereinafter, with reference to FIG. 22, the artistic presentation process performed in step 57 will be described.

Figure 22:
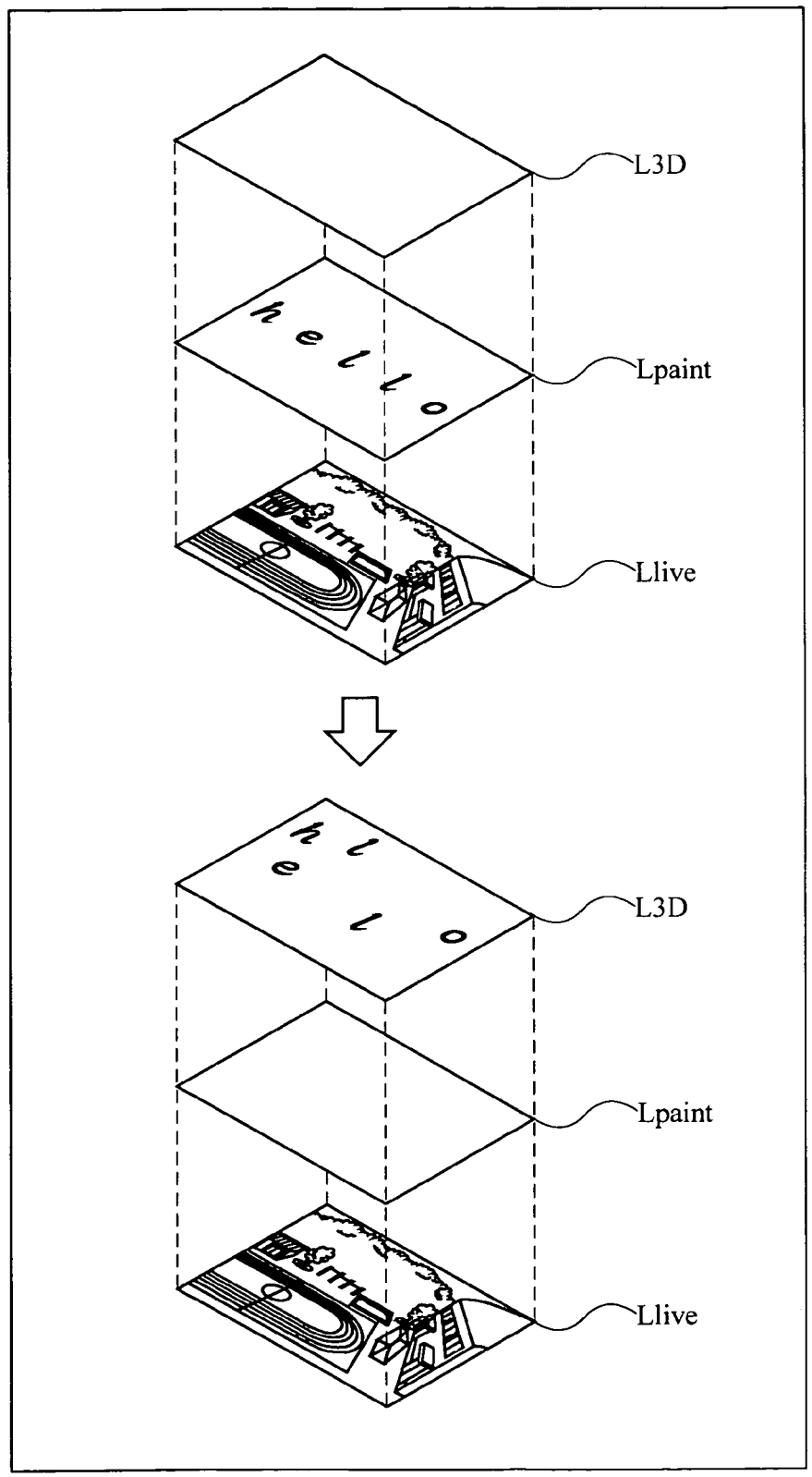
FIG. 22 is a diagram showing an example of multiple layers composing a screen.

As shown in FIG. 22, a screen displayed on the lower LCD 12 is composed of a plurality of layers. Specifically, the screen is composed of a live layer Llive, which loads and displays thereon a real time image (captured image) captured by the inner camera 23 or the outer camera 25, or an image (photographed image), which is stored in the game apparatus 1 or in the memory card 28 as image data, a paint layer Lpaint, which loads and displays thereon a hand-drawn image, and a 3D texture layer L3D, which loads and displays thereon an object or the like moving on the screen, for example.

When the user inputs, for example, hand-drawn characters and hand-drawn stamps via the touch panel 13, a hand-drawn image according to the input is loaded onto the paint layer Lpaint (Upper drawing in FIG. 22). When the user performs the all-delete operation thereafter, among an image displayed on the paint layer Lpaint, only such blocks that belong to a group which is classified by the image disassembling process (specifically, block having group number Gn, where Gn is 1 or more) is copied onto the 3D texture layer L3D, and the entire hand-drawn image loaded on the paint layer Lpaint is deleted (Lower drawing in FIG. 22).

In the artistic presentation process, a predetermined initial speed is given to each of the blocks loaded onto the 3D texture layer L3D, and is described in the block moving data Dc. In this case, moving speeds and moving directions provided to the respective groups are determined at random, and a common moving speed in a common moving direction is provided, as the initial speed, to each of such blocks that belong to a group having a common group number Gn.

Figure 23A:
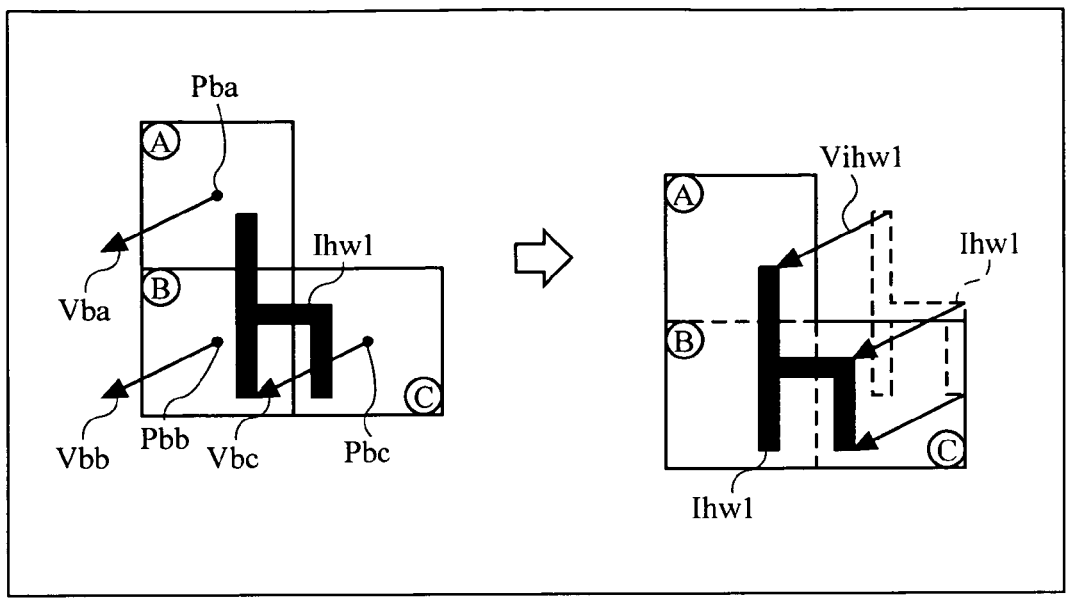
FIG. 23A is a diagram showing exemplary moving speeds applied to blocks A to C, respectively, which belong to a common group, when the blocks A to C are to move.

For example, as shown with Right drawing in FIG. 23A, when the blocks A to C are included in a common group, a common moving vector Vba to Vbc are located at central positions Pba to Pbc of the blocks A to C. Therefore, the common moving speed in the common moving direction is provided, as the initial speed, to each of the blocks A to C. In accordance with the moving data (moving speed and moving direction) of each of the blocks described in the block moving data Dc, the CPU 31 causes each of the blocks to move on the 3D texture layer L3D, along with respective parts of the hand-drawn image described thereon. Thereafter, acceleration is given to each of the blocks every processing time unit so as to cause each of the blocks to freefall in a predetermined direction (for example, in the downward direction of the lower LCD 12), and then the block moving data Dc is updated.

In this manner, the moving speed is given to each of the block, whereby the parts of the hand-drawn image described on each of the blocks is moved and displayed on the lower LCD 12. Inevitably, a common moving speed in a common moving direction is given to such blocks that belong to a common group, whereas blocks in different groups are given different moving speeds in different moving directions, respectively. Therefore, blocks move on a group-by-group basis, and accordingly, the hand-drawn image (the hand-drawn character Ihw1), which is divided into groups, is represented as if moving in the divided group units (see Right drawing in FIG. 23A). Since the acceleration in a predetermined direction is applied to each of the blocks, each of the blocks moves to the outside of the display range of the lower LCD 12, and the hand-drawn image described in each of the blocks are deleted from the lower LCD 12 (see FIG. 3 to FIG. 6).

In the above description, the acceleration is applied to each of the block so as to cause each of the blocks to freefall in a predetermined direction. However, the acceleration need not be applied. In this case, each of the blocks moves according to the initial speed given to each of the blocks. Therefore, the hand-drawn image divided into groups is represented as if flying and moving in all directions.

With reference back to FIG. 11, after the artistic presentation process in step 57, the CPU 31 determines whether or not the artistic presentation process ends or not (step 58). When the artistic presentation process is yet to end, the CPU 31 continues the process in step 57. On the other hand, when the artistic presentation process has ended, the CPU 31 advances the processing to subsequent step 60.

On the other hand, when the operation data obtained in step 52 is not data indicative of the handwriting input or all-delete operation (No in step 53 and step 55), the CPU 31 performs another process (step 59) corresponding to the operation data, and advances the processing to subsequent step 60.

In step 60, the CPU 31 determines whether or not to terminate the image processing. The image processing is terminated, for example, when conditions for terminating the image processing are satisfied, or when the user performs an operation to terminate the image processing. The CPU 31 returns to step 52 to repeat the processing when the image processing is not terminated, whereas the CPU 31 terminates the processing in the flowchart when the image processing is terminated.

In this manner, in the game apparatus 1 according to the present embodiment, when a hand-drawn image displayed in accordance with a handwriting input by a user operation is to be all deleted by the user operation, the hand-drawn image is disassembled into groups, and each of the disassembled groups moves individually. Accordingly, when the user performs a handwriting input to write a scrawl and then performs the all-delete operation to delete the scrawl, a novel artistic effect is added to the all-delete operation, and thus the user finds enjoyment in the operation.

In the above-described process of disassembling the hand-drawn image, an image generated through a handwriting input by a user is disassembled into groups each composed of a continuous part of the image. However, the image may be disassembled in a different manner. For example, an image to be all deleted may be disassembled in accordance with colors composing the image, or the image to be all deleted may be disassembled in accordance with input strokes (e.g., free lines each inputted continuously from start of touching on the touch panel 13 until end of the touching) performed by the user. Alternatively, edges of the image to be all deleted are extracted, and then the image may be disassembled in accordance with the edges. Still alternatively, the display screen is divided into predetermined shapes (e.g., a predetermined mesh shape), and the image to be all deleted may be disassembled into the predetermined shapes. In the case of disassembling in accordance with the input strokes performed by the user, provided that the history of the handwriting input by the user (e.g., the history of touch positions inputted on the touch panel 13) is stored, it is possible to disassemble the hand-drawn image in accordance with the input strokes.

In the above-described process of disassembling the hand-drawn image, the hand-drawn image is divided into predetermined division areas (blocks), and the division areas are classified as groups in accordance with the hand-drawn image. Therefore, a load of the disassembling process may be advantageously reduced. However, if such advantage is not expected, the hand-drawn image may be disassembled in accordance with another method. For example, pixels indicating the hand-drawn image may be classified as groups such that mutually adjacent pixels are classified as belonging to a common group.

Further, in the above-described embodiment, the hand-drawn image including the hand-drawn characters, hand-drawn lines, hand-drawn stamps, and the like, which are displayed through the handwriting input by the user operation, is the target of the all-delete operation. However, other image may be the target of the all-delete operation of the present invention. For example, any image which is displayable on the lower LCD 12 and/or the upper LCD 22 of the game apparatus 1, such as a captured image based on image data loaded by the user using the inner camera 23 or the outer camera 25, and a photographed image based on image data of a captured image temporarily stored in a predetermined storage medium may be the target of the all-delete operation. Specifically, an instruction for photographing using the inner camera 23 or the outer camera 25 may be given, when the user presses the operation button 14G or the operation button 14H of the game apparatus 1. With the above-described photographing process, an image photographed by the inner camera 23 or the outer camera 25 can be stored (saved) in the stored data memory 34 or the memory card 28. The CPU 31 may use the image obtained according to such a photographing process or the image photographed in real time as a target image for the disassembling process. In this case, by disassembling the target image in accordance with colors, by disassembling the target image in accordance with edges through edge extraction, or by disassembling the target image in accordance with predetermined shapes, the same artistic presentation effect as that for the above-described hand-drawn image may be obtained at the time of the all-delete operation.

Further, in the above-described artistic presentation process, the case is described where each of the groups of the disassembled hand-drawn image is moved and deleted in various directions. However, another artistic animation process may be applied in which the hand-drawn image is moved in disassembled image units, or a display angle or a shape of the hand-drawn image is changed. For example, when the groups of the disassembled hand-drawn image may be rotated and then deleted, respectively, or may be down sized and then deleted, respectively. Alternatively, the groups may be deleted after the degree of the transparency is changed while the groups are enlarged.

In the above-described artistic presentation process, a common moving vector is given to respective blocks included in a common group, as shown in FIG. 23A, whereby each group moves integrally. However, when the group is rotated in the above-described manner, different moving vectors will be given to the respective blocks included in the group.

Figure 23B:
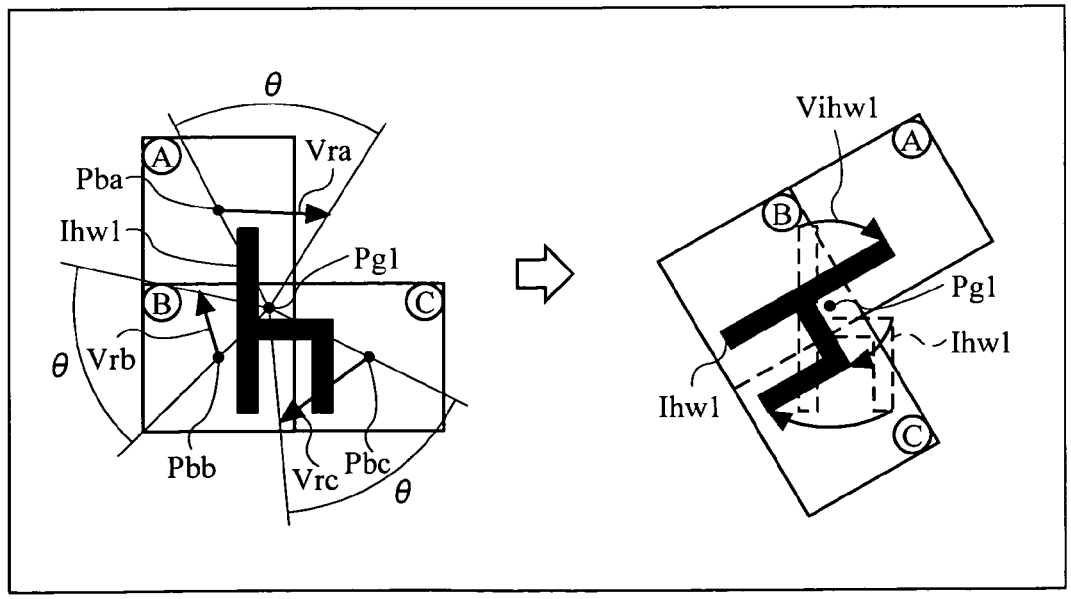
FIG. 23B is a diagram showing exemplary moving speeds of blocks A to C, respectively, which belong to a common group, when the blocks A to C are to rotate.

For example, as shown in FIG. 23B, suppose a case where blocks A to C belong to a common group, and the blocks A to C are rotated integrally. In this case, in accordance with distances from a gravity center Pg1 of the blocks A to C to respective central positions Pba to Pbc of blocks A to C, moving vectors Vra to Vrc are calculated, the moving vectors respectively causing the blocks A to C to move in a common rotation direction around the gravity center Pg1. The blocks A to C are moved θ degrees around the gravity center Pg1, respectively, and accordingly, the blocks A to C are caused to rotate θ degrees around the respective central positions Pba to Pbc. Accordingly, the hand-drawn image divided into groups (the hand-drawn character Ihw1) is represented as if rotating in the divided group units (see Right drawing in FIG. 23B). It is clear that by adding the above-described moving vectors Vba to Vbc for movement to such moving vectors Vra to Vrc for rotation, respectively, the artistic presentation can be achieved in which the hand-drawn image divided into groups moves while rotating in the display screen.

The above-described image processing describes the exemplary artistic presentation of the divided hand-drawn image when the user performs the all-delete operation. However, a similar artistic presentation may be performed when the user performs a partial delete operation. For example, when the user performs an operation to specify a range of deletion, the image disassembling process is performed with respect to only such blocks that are included in the range of deletion so as to perform the artistic presentation, and a part of the hand-drawn image described on blocks outside the range of deletion is kept loaded on the paint layer Lpaint (see FIG. 22). Accordingly, the present invention may be applied to the partial delete operation.

The above-described artistic presentation process exemplifies the case where, in accordance with the all-delete operation performed by the user, the blocks of the disassembled hand-drawn image move to the outside of the display range of the lower LCD 12, and the respective blocks of the hand-drawn image are deleted from the lower LCD 12. However, the present invention may be applicable even if the respective blocks of the hand-drawn image are not deleted from the display screen, provided that the display position or the display form of the each block of the hand-drawn image is changed. To change the display form of the disassembled hand-drawn image includes processes to change (e.g., enlarge or downsize) shapes of the blocks of the disassembled hand-drawn image, to change (rotate) display direction of each of the blocks of the disassembled hand-drawn image, to change colors of the blocks of disassembled hand-drawn image, to cause each of the blocks of the disassembled hand-drawn image to blink, and to change the degree of transparency of each of the blocks of the disassembled hand-drawn image. For example, it may be possible to cause each of the blocks of the disassembled hand-drawn image to move such that the blocks of the disassembled hand-drawn image are gathered and overlapped with one another at a predetermined position on the lower LCD 12 in accordance with the all-delete operation performed by the user. Further, it may be possible to cause each of the blocks of the disassembled hand-drawn image to move such that each of the blocks of the disassembled hand-drawn image floats and moves within the lower LCD 12 in accordance with a predetermined operation (not necessarily the all-delete operation, in this case) performed by the user. Still further, in accordance with a predetermined operation (not necessarily the all-delete operation, in this case) performed by the user, the blocks of the disassembled hand-drawn image may be displayed on the lower LCD 12 by changing the colors of the blocks, or by causing the blocks to blink at individual timings.

As described with reference to FIG. 22, the case has been described where when the user inputs hand-drawn characters and hand-drawn stamps, for example, the hand-drawn image corresponding to the input is loaded onto the paint layer Lpaint. However, the hand-drawn image may be loaded and displayed on another layer. For example, when the user inputs the hand-drawn characters or the hand-drawn stamps, for example, the hand-drawn image may be displayed by loading the hand-drawn image corresponding to the input onto the 3D texture layer L3D.

Further, in the above-described, embodiment, as an example of a LCD display section having two screens, the case has been described, where the lower LCD 12 and the upper LCD 22 physically separated from each other are arranged one above the other (the case of two screens above and below). However, a configuration of a display screen having two screens may be another configuration. For example, the lower LCD 12 and the upper LCD 22 may be arranged on a main surface of the lower housing 11 laterally side by side. Alternatively, a vertically long LCD having the same width as the lower LCD 12 and having a vertical length which is twice as large as that of the lower LCD 12 (namely, an LCD which is physically one unit and has a display size with a vertical length equal to a sum of vertical lengths of two screens) may be provided in the main surface of the lower housing 11, and the above two images (e.g., a captured image and an image showing an operation explanation screen) may be displayed one above the other (displayed so as to be adjacent to each other without a boundary portion between the above and below). Still alternatively, a horizontally long LCD having the same vertical length as the lower LCD 12 and having a width which is twice as large as that of the lower LCD 12 may be provided in the main surface of the lower housing 11, and the two images may be displayed laterally side by side (displayed so as to be adjacent to each other without a boundary portion between left and right). In other words, a physically one screen may be divided into two and used to display two images. In either form of an image, when the two images are displayed by physically dividing one screen into two, the touch panel 13 may be provided on an entirety of the screen.

Further, in the above-described embodiment, the game apparatus 1 is provided integrally with the touch panel 13. However, even if the game apparatus and the touch panel may be provided independently of each other, it should be understood that the present invention can be realized. Alternatively, the touch panel 13 may be provided on an upper surface of the upper LCD 22, and the display image displayed on the lower LCD 12 may be displayed on the upper LCD 22. Further, although the two display screens (the lower LCD 12 and the upper LCD 22) are provided in the above embodiment, only one display screen may be provided. In other words, in the above embodiment, the upper LCD 22 is not provided, but only the lower LCD 12 may be provided as a display screen, and the touch panel 13 may be provided on the lower LCD 12. Still alternatively, in the above embodiment, without having the lower LCD 12, the touch panel 13 may be provided on the upper surface of the upper LCD 22, and the display image displayed on the lower LCD 12 may be displayed on the upper LCD 22.

Further, in the above-described embodiment, as input means of the game apparatus 1 for realizing a coordinate input, the touch panel 13 is used. However, another pointing device may be used. Here, the pointing device is an input device for designating an input position or a coordinate point on a screen, and, for example, a mouse, a track pad, a trackball, a pen tablet, joystick, or the like is used as the input device. When position information on the screen coordinate system calculated from an output value outputted from the input device is used, the present invention can be realized similarly.

Further, in the case of a stationary game apparatus whose game controller is held by the player while a game is played, a pointing device in another form is considered. For example, a camera fixed to a housing of the game controller can be used as the pointing device. In this case, in accordance with change in a position at which the housing of the game controller is pointed, an image captured by the camera is changed. Thus, by analyzing the captured image, a coordinate point at which the housing is pointed with respect to the display screen can be calculated.

In this case, the coordinate point of the position at which the housing is pointed is used as the touch coordinate point used for the above-described processing, whereby the present invention can be realized. Whether or not an input such as touching on the touch panel or releasing the touching from the touch panel is determined by detecting an input from the game controller other than the coordinate point input, or by detecting change in the input. As a first example, the touching on or releasing the touching is determined by detecting whether or not any of the operation buttons provided to the game controller is pressed (e.g., pressing the A button indicates the touching on). In a second example, the game controller is composed of two housings. One of the housings has the above-described cameras mounted therein, and the other housing has a detection section such as an accelerometer which outputs a signal in accordance with a motion of the housing. In this case, in accordance with the motion of the other housing, the touching on or releasing the touching is determined (for example, tilting of the housing in a predetermined direction indicates the touching on). In a third example, voice input means such as a microphone is provided to the housing of the game controller. In this case, the touching on or releasing the touching is switched when the player utters a predetermined voice, and accordingly the determination is made.

Further, the above embodiment has been described using the hand-held game apparatus 1 and the stationary game apparatus. However, the present invention may be realized by an information processing apparatus, such as a common personal computer, by executing the image processing program of the present invention.

Further, the shape of the above game apparatus 1, and the shapes, numbers, and installed positions of the operation buttons 14 and the touch panel 13 provided therein are merely examples, and the present embodiment can be realized with other shapes, numbers and installed positions. Further, a processing order or the like used in the above-described image processing is merely an example, and the present embodiment can be realized with another processing order. For example, in the above-described processing order, the connection relation between blocks is determined in order of the right adjacent block, upper adjacent block, left adjacent block, and the lower adjacent block. However, the connection relation between the blocks may be determined in other orders.

The storage medium having stored thereon the image processing program and the image processing apparatus of the present embodiment are capable of processing an image by adding a novel artistic effect when the image displayed by a user is processed by the user, and are useful not only for an apparatus or the like which displays a hand-drawn image in accordance with a user operation, but also for a program or the like which is executed on the apparatus.

While the embodiment presented herein has been described in detail, the foregoing description is in all aspects illustrative and not restrictive. It is understood that numerous other modifications and variations can be devised without departing from the scope of the embodiment.

What is claimed is:

1. A non-transitory computer-readable storage medium having stored thereon an image processing program executed on a computer of an apparatus for performing predetermined processing on an image generated in accordance with an output from a pointing device, the image processing program causing the computer to perform:
   image generation for generating an input image in accordance with the output from the pointing device;
   image display control for displaying the input image generated by the image generation on a display unit; and
   image change control for disassembling the input image generated by the image generation into a plurality of partial images after receiving user input initiating a delete operation of the input image, and for changing at least one of a display position and a display form of each of the partial images, wherein
   the image change control changes a partial image which is a target of the delete operation, displays the changed partial image on the display unit, and deletes the displayed changed partial image, which is the target of the deletion operation, from the display screen.

2. The non-transitory computer-readable storage medium having stored thereon the image processing program according to claim 1, wherein
   the image change control divides a display area of the input image into blocks each composed of a plurality of pixels, and disassembles the input image into the plurality of partial images in block units.

3. The non-transitory computer-readable storage medium having stored thereon the image processing program according to claim 1, the image processing program further causing the computer to perform:
   continuity determination for determining continuous portions in the input image, wherein
   in accordance with determination by the continuity determination, the image change control disassembles the input image into the plurality of partial images such that the continuous portions belong to a common one of the partial images.

4. The non-transitory computer-readable storage medium having stored thereon the image processing program according to claim 3, wherein
   the image change control divides a display area of the input image into blocks each composed of a plurality of pixels, and disassembles the input image into the plurality of partial images in block units,
   the continuity determination determines that blocks are continuous when the input image extends continuously over the blocks, and
   the image change control further disassembles, in accordance with the determination by the continuity determination, the input image into the plurality of partial images such that the continuous blocks belong to a common one of the partial images.

5. The non-transitory computer-readable storage medium having stored thereon the image processing program according to claim 4, wherein
   when the input image is included in a bordering area of either one of two adjacent blocks, the continuity determination determines that the two blocks are continuous to each other.

6. The non-transitory computer-readable storage medium having stored thereon the image processing program according to claim 4, wherein
   when the input image is included in bordering areas of two adjacent blocks, the continuity determination determines that the two blocks are continuous to each other.

7. The non-transitory computer-readable storage medium having stored thereon the image processing program according to claim 6, wherein
   the continuity determination further determines whether or not the input image included in the bordering area of either one of the two adjacent blocks and the input image included in the bordering area of the other one of the two adjacent blocks are continuous to each other, and concludes that the two adjacent blocks are continuous to each other when the input images are continuous to each other.

8. The non-transitory computer-readable storage medium having stored thereon the image processing program according to claim 4, wherein
   the continuity determination determines whether or not an adjacent block, which is adjacent to one block and is determined to be continuous to the one block, is continuous to another block, which is adjacent to the adjacent block, and concludes, in the case of the adjacent block and the another block being continuous, that the one block, the adjacent block and the another block are continuous to one another.

9. The non-transitory computer-readable storage medium having stored thereon the image processing program according to claim 1, wherein
   the image change control provides a common moving speed in a common moving direction to respective element images composing each of the partial images, and changes a display position of each of the partial images.

10. The non-transitory computer-readable storage medium having stored thereon the image processing program according to claim 4, wherein
    the image change control provides a common moving speed in a common moving direction to the blocks which are determined by the continuity determination to be continuous to each other, and changes a display position of each of the partial images.

11. The non-transitory computer-readable storage medium having stored thereon the image processing program according to claim 1, wherein
    the apparatus includes an imaging unit for capturing an image of surroundings of the apparatus, and
    the image display control displays a captured image captured by the imaging unit on the display unit in real time, overlaps the input image generated by the image generation on the captured image, and displays a resultant image on the display unit.

12. The non-transitory computer-readable storage medium having stored thereon the image processing program according to claim 1, wherein
the image generation generates a hand-drawn image in accordance with the output from the pointing device.

13. The non-transitory computer-readable storage medium having stored thereon the image processing program according to claim 1, wherein
the image generation generates a predetermined synthesis image to be displayed at a position based on the output from the pointing device.

14. The non-transitory computer-readable storage medium having stored thereon the image processing program according to claim 1, wherein
the image generation generates a second input image in accordance with an output from the pointing device after a first input image is generated,
the image display control synthesizes and displays the first input image and the second input image, and
the image change control treats an image obtained by synthesizing the first input image and the second input image as one image, and disassembles the synthesized image.

15. The non-transitory computer-readable storage medium having stored thereon the image processing program according to claim 1, wherein
when the user performs an all-delete operation, the image change control disassembles an entirety of the input image into the plurality of partial images, changes at least one of the display position and the display form of each of the plurality of partial images so as to be displayed on the display unit, and deletes all the displayed partial images from the display screen.

16. The non-transitory computer-readable storage medium having stored thereon the image processing program according to claim 1, wherein
the image change control causes the partial images to move to different display positions, respectively, and displays the partial images on the display unit.

17. The non-transitory computer-readable storage medium having stored thereon the image processing program according to claim 16, wherein
the image change control causes each of the partial images to move to the outside of the display screen, and deletes the partial images from the display screen.

18. The non-transitory computer-readable storage medium having stored thereon the image processing program according to claim 16, wherein
the image change control provides initial speeds in different directions to the plurality of partial images, respectively, also provides acceleration in a predetermined common direction to the partial images, and deletes the partial images from the display screen.

19. The non-transitory computer-readable storage medium having stored thereon the image processing program according to claim 1, wherein
the pointing device is a touch panel which covers a display screen of the display unit.

20. The non-transitory computer-readable storage medium having stored thereon the image processing program according to claim 1, wherein
the image change control disassembles the input image generated by the image generation in accordance with respective colors of the input image.

21. The non-transitory computer-readable storage medium having stored thereon the image processing program according to claim 1, the image processing program further causes the computer to perform:
input position history storage control for storing, in a memory, a history of input positions corresponding to the output from the pointing device, wherein
in accordance with the history of the input positions, the image change control disassembles the input image generated by the image generation into partial images each composed of such input positions that are continued, among the input positions used by the image generation for generating the input image.

22. The non-transitory computer-readable storage medium having stored thereon the image processing program according to claim 1, wherein
the image change control disassembles the input image generated by the image generation in a predetermined mesh shape.

23. The non-transitory computer-readable storage medium having stored thereon the image processing program according to claim 1, wherein
the image change control displays the disassembled partial images on the display unit by rotating each of the disassembled partial images.

24. The non-transitory computer-readable storage medium having stored thereon the image processing program according to claim 1, wherein
the image change control displays the disassembled partial images on the display unit by enlarging or downsizing each of the disassembled partial images.

25. The non-transitory computer-readable storage medium having stored thereon the image processing program according to claim 1, wherein
the image change control displays the disassembled partial images on the display unit by changing colors of each of the disassembled partial images.

26. The non-transitory computer-readable storage medium having stored thereon the image processing program according to claim 1, wherein
the image change control displays the disassembled partial images on the display unit by causing each of the disassembled partial images to blink.

27. An image processing apparatus performing predetermined processing on an image generated in accordance with an output from a pointing device, the image processing apparatus comprising:
an image generation unit for generating an input image in accordance with the output from the pointing device;
an image display control unit for displaying the input image generated by the image generation unit on a display unit; and
an image change control unit for disassembling the input image generated by the image generation unit into a plurality of partial images after receiving user input initiating a delete operation of the input image, and for changing at least one of a display position and a display form of each of the partial images, wherein
the image change control unit is configured to change a partial image which is a target of the delete operation, display the changed partial image on the display unit, and delete the displayed changed partial image, which is the target of the deletion operation, from the display screen.

28. A method for performing predetermined processing on an image generated in accordance with an output from a pointing device, the method comprising:
generating an input image in accordance with the output from the pointing device;

displaying the generated input image on a display unit; and disassembling the generated input image into a plurality of partial images after receiving user input initiating a delete operation of the input image, and changing at least one of a display position and a display form of each of the partial images, wherein the disassembling changes a partial image which is a target of the delete operation, displays the changed partial image on the display unit, and deletes the displayed changed partial image, which is the target of the deletion operation, from the display screen.

* * * * *